(12) United States Patent
Wang et al.

(10) Patent No.: US 11,223,751 B2
(45) Date of Patent: *Jan. 11, 2022

(54) PHOTOSENSITIVE ASSEMBLY AND CAMERA MODULE AND MANUFACTURING METHOD THEREOF

(71) Applicant: NINGBO SUNNY OPOTECH CO., LTD., Zhejiang (CN)

(72) Inventors: Mingzhu Wang, Ningbo (CN); Zhenyu Chen, Ningbo (CN); Takehiko Tanaka, Ningbo (CN); Zhongyu Luan, Ningbo (CN); Bojie Zhao, Ningbo (CN); Zhen Huang, Ningbo (CN); Nan Guo, Ningbo (CN); Fengsheng Xi, Ningbo (CN); Heng Jiang, Ningbo (CN); Zilong Deng, Ningbo (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/747,455

(22) Filed: Jan. 20, 2020

(65) Prior Publication Data

US 2021/0127040 A1 Apr. 29, 2021

Related U.S. Application Data

(63) Continuation of application No. 16/392,595, filed on Apr. 23, 2019, now Pat. No. 10,582,097, which is a continuation of application No. 15/473,565, filed on Mar. 29, 2017, now Pat. No. 10,321,028.

(51) Int. Cl.
H04N 5/225 (2006.01)

(52) U.S. Cl.
CPC ......... *H04N 5/2252* (2013.01); *H04N 5/2253* (2013.01); *H04N 5/2254* (2013.01); *H04N 5/2257* (2013.01)

(58) Field of Classification Search
CPC .. H04N 5/2252; H04N 5/2253; H04N 5/2257; H04N 5/2254
See application file for complete search history.

(56) References Cited

U.S. PATENT DOCUMENTS

| | | | |
|---|---|---|---|
| 8,780,243 B2* | 7/2014 | Chen | H04N 5/2257 348/294 |
| 10,044,917 B2* | 8/2018 | Otani | H04N 5/2257 |
| 2005/0012032 A1* | 1/2005 | Onodera | H01L 31/0203 250/214.1 |
| 2008/0079829 A1* | 4/2008 | Choi | H01L 27/14618 348/294 |
| 2009/0033790 A1* | 2/2009 | Lin | G02B 7/023 348/374 |
| 2009/0128681 A1* | 5/2009 | Kim | H04N 5/2257 348/335 |

(Continued)

*Primary Examiner* — Shahbaz Nazrul
(74) *Attorney, Agent, or Firm* — Wenderoth, Lind & Ponack, L.L.P.

(57) ABSTRACT

A camera module and its photosensitive assembly and manufacturing method thereof are provided. The photosensitive assembly includes a photosensitive element, a window circuit board and a packaging body integrally packaged the photosensitive element and the window circuit board to form an integrated body, wherein the window circuit board has at least one window for receiving the photosensitive element therein.

8 Claims, 17 Drawing Sheets

(56) References Cited

U.S. PATENT DOCUMENTS

| | | | |
|---|---|---|---|
| 2009/0322929 A1* | 12/2009 | Webster | H01L 27/14625 348/340 |
| 2011/0194023 A1* | 8/2011 | Tam | H04N 5/2253 348/374 |
| 2013/0235263 A1* | 9/2013 | Ryu | H04N 5/2253 348/374 |
| 2014/0055669 A1* | 2/2014 | Chen | H01L 27/14618 348/374 |
| 2014/0139710 A1* | 5/2014 | Chen | H04N 5/2257 348/294 |
| 2017/0280558 A1* | 9/2017 | Ohara | G03B 17/55 |

* cited by examiner

PHOTOSENSITIVE ASSEMBLY AND CAMERA MODULE AND MANUFACTURING METHOD THEREOF

CROSS REFERENCE OF RELATED APPLICATION

This is a Continuation application that claims priority under 35 U.S.C. § 120 to a non-provisional application, application Ser. No. 16/392,595, filed Apr. 23, 2019, which is a Continuation application that claims priority under 35 U.S.C. § 120 to a non-provisional application, application Ser. No. 15/473,565, filed Mar. 29, 2017, which claims priority under 35 U.S.C. § 119 to Chinese application number CN 20161051660.2, filed and Jul. 3, 2016 and Chinese application number CN 201620691699.5, filed Jul. 3, 2016, wherein the entire contents of each of which are expressly incorporated herein by reference.

BACKGROUND OF THE PRESENT INVENTION

Field of Invention

The present invention relates to camera module, and more particularly to a molded camera module and its photosensitive assembly and manufacturing method thereof.

Description of Related Arts

The conventional camera modules are usually packaged through the COB (Chip On Board) process, as a relatively mature packaging technology, COB package has its advantages, while it also has many disadvantages.

The conventional camera module typically includes a circuit board, a photosensitive element (or photosensitive chip), an optical filter, a base, a driver, a lens, and electronic (resistor-capacitor) components. These components are packaged through the COB process, and the photosensitive chip is connected on the circuit board, the optical filter is mounted on the base and positioned in a photosensitive path of the photosensitive chip, the driver is mounted on the circuit board, and the lens is mounted on the driver to position the lens be aligned in the photosensitive path of the photosensitive chip and adjust a focal length of the camera module by the driver.

Firstly, in such a conventional manner, the photosensitive chip is attached on an upper surface of the circuit board. In this process, the photosensitive chip is usually adhered to the circuit board by glue bonding. For the camera module, the uniformity of the optical axis is a very important aspect and, therefore, the requirement of the flatness of the circuit board and the photosensitive chip is relatively high so as to further coincide the main optical axis of the lens with the central optical axis of the photosensitive chip.

Secondly, the base is fixed to the circuit board in an adhering manner, and the filter, the driver and the lens components are all depend on the base. Therefore, the flatness of the base itself and the flatness of the installing operation are highly demanded.

Thirdly, the photosensitive chip is electrically connected to the circuit board through one or more gold wires and the resistor-capacitor components are protruded from the circuit board. Therefore, when the base is installed, a space must be reserved for the gold wires and the resistor-capacitor components while the gold wires and the resistor-capacitor components must be kept not in touch with each other in all directions. This results in unnecessary space occupation. On the other hand, the resistor-capacitor components are easily contaminated with dust and debris, which does influence the imaging quality of the camera module and cause the formation of black spots.

Fourthly, it is also a relatively important aspect that, corresponding to the development of various intelligent devices, such as smart phones, a lighter and thinner camera module is increasingly needed that the camera module is developed to have been extremely miniaturized, so that to minimize its space to be occupied is very important. However, in the above assembling process, the photosensitive chip, the circuit board and the resistor-capacitor components all take up space, which makes the size of the conventional camera module being very difficult to be reduced. In such an adhesive-type structure, since the photosensitive chip has a certain thickness, it is necessary to provide a space for the photosensitive chip to be attached on and protruded from the circuit board while mounting other components before mounting the base.

Fifthly, the height of the camera module is required to meet the requirement of optical imaging. In this conventional assembly process, the photosensitive chip is attached to the circuit board and the optical filter is mounted on the base, so that the back focus of the camera module is large and the overall height of the camera module is large too.

SUMMARY OF THE PRESENT INVENTION

The main object of the invention is to provide a packaged camera module and its photosensitive assembly and manufacturing method thereof, wherein the photosensitive assembly comprises a photosensitive element, a window circuit board and a packaging body, wherein the photosensitive element and the window circuit board are integrally connected and packaged by the packaging body.

Another object of the invention is to provide a packaged camera module and its photosensitive assembly and manufacturing method thereof, wherein the photosensitive element and the window circuit board are integrally packaged by the packaging body in an overlapping manner, so as to reduce the relative height of the photosensitive element and the window circuit board.

Another object of the invention is to provide a packaged camera module and its photosensitive assembly and manufacturing method thereof, wherein the window circuit board has a window for receiving the photosensitive element therein such that the installation of the photosensitive element will not increase the thickness of the window circuit board and thus the relative height of the photosensitive element and the window circuit board can be minimized, so as to minimize the height of the packaged camera module.

Another object of the invention is to provide a packaged camera module and its photosensitive assembly and manufacturing method thereof, wherein the window of the window circuit board is a central through hole that renders the photosensitive element and the window circuit board having an adjustable relative height so as to enable the present invention to adapt for various circuit boards having different thickness.

Another object of the invention is to provide a packaged camera module and its photosensitive assembly and manufacturing method thereof, wherein the bottom of the photosensitive element is exposed to outside to improve the heat dissipation performance of the photosensitive element.

Another object of the invention is to provide a packaged camera module and its photosensitive assembly and manufacturing method thereof, wherein the photosensitive element and the window circuit board are electrically connected with each other by one or more connecting wires which are integrally packaged by the packaging body.

Another object of the invention is to provide a packaged camera module and its photosensitive assembly and manufacturing method thereof, wherein the photosensitive assembly comprises a photosensitive element, a window circuit board having a window receiving the photosensitive element therein and an optical filter which is provided above the photosensitive element to shelter and protect the photosensitive element from any contaminant and reduce the back focal length of the packaged camera module.

Another object of the invention is to provide a packaged camera module and its photosensitive assembly and manufacturing method thereof, wherein the packaging body comprises a lens portion extended upwardly and integrally, adapted for being mounted with the lens of the packaged camera module, so as to provide a flat and stable mounting condition.

Another object of the invention is to provide a packaged camera module and its photosensitive assembly and manufacturing method thereof, wherein the packaging body can be downwardly extended to the bottom of the photosensitive assembly and packaged from a lower portion of the photosensitive assembly.

In order to achieve the foregoing and other objects and advantages of the present invention, the present invention provides a photosensitive assembly, which comprises at least one photosensitive element, at least one window circuit board having a window receiving the photosensitive element therein, and at least one packaging body, wherein the photosensitive element and the window circuit board are integrally packaged by the packaging body to form the photosensitive assembly as an integral body, wherein the packaging body forms a light window therein corresponding to the photosensitive element to define a photosensitive path thereof, wherein the window circuit board comprises a board body having an indention forming the window sized and shaped for receiving the photosensitive element therein.

In some embodiments, the window is a recess and the photosensitive element is received and installed in the recess.

In some embodiments, the photosensitive element and the board body of the window circuit board are electrically connected by one or more electrical connectors, wherein one end of each of the electrical connectors is connected with the photosensitive element, and another end of the respective electrical connector is connected to a top surface of the board body, wherein the top surface of the board body is located around the window.

In some embodiments, the photosensitive element and the board body of the window circuit board are electrically connected by one or more electrical connectors, wherein one end of each of the electrical connectors is connected to the photosensitive element, and another end of the respective electrical connector is connected to a top surface of the board body that is positioned within the window.

In some embodiments, the window is a through hole and the photosensitive element is received and positioned in the through hole.

In some embodiments, the photosensitive element is electrically connected by one or more electrical connectors, wherein one end of each of the electrical connectors is connected with the photosensitive element, and another end of the respective electrical connector is connected to a top surface of the board body.

In some embodiments, the photosensitive assembly comprises a substrate, which is provided below the photosensitive element.

In some embodiments, the photosensitive assembly comprises a substrate, wherein the substrate is provided in the window and has a recessed shape to receive the photosensitive element therein.

In some embodiments, the one or more electrical connectors are integrally packaged by the packaging body.

In some embodiments, the photosensitive assembly comprises at least one electronic component which is protruded or partially protruded from the board body and integrally packaged by the packaging body.

In some embodiments, the photosensitive element has a photosensitive area and a non-photosensitive area, wherein the packaging body integrally packages at least part of the non-photosensitive area.

In some embodiments, the photosensitive assembly further comprises a ring-shaped blocking member which is provided around the photosensitive area of the photosensitive element.

In some embodiments, the packaging body has a step-shaped surface.

In some embodiments, the packaging body has a flat surface.

In some embodiments, the packaging body comprises a holding portion and a lens portion, wherein the lens portion has an exterior extended integrally along the holding portion and an interior having a step-shaped structure, wherein the holding portion is provided for mounting an optical filter thereon and the lens portion is provided for mounting a lens therein.

In some embodiments, the lens portion has a flat interior surface which is adapted for mounting an unthreaded lens thereon.

In some embodiments, the lens portion has a threaded interior surface which is adapted for mounting a threaded lens.

In some embodiments, the board body has a reinforcing hole, wherein the packaging body is extended into the reinforcing hole.

In some embodiments, the board body has a reinforcing hole, wherein the packaging body passes through the reinforcing hole and extends to the bottom of the board body.

In some embodiments, the photosensitive assembly comprises an optical filter, which is installed on top of the photosensitive element.

In some embodiments, the photosensitive assembly comprises an optical filter, which has an edge integrally packaged by the packaging body.

In some embodiments, the photosensitive assembly comprises a backplane, which is fittingly attached on the bottom of the board body.

In some embodiments, the integral package body is made by molding.

According to another aspect of the present invention, the present invention provides a camera module, which comprises a photosensitive assembly and at least one lens, wherein the lens is located along the light sensing path (photosensitive path) of a photosensitive element of the photosensitive assembly.

In some embodiments, the camera module comprises at least one driver which is provided for the lens and is installed at the photosensitive assembly.

In some embodiments, the camera module comprises at least one holder, wherein the holder is provided at the photosensitive assembly.

In some embodiments, the camera module comprises a plurality of photosensitive elements and a plurality of lenses assembled to form an arrayed camera module.

In some embodiments, the window circuit boards of the photosensitive assemblies are integrally connected with each other.

According to another aspect of the present invention, the present invention further provides a method of manufacturing a photosensitive assembly, which comprises the steps of:

(A) arranging at least a photosensitive element in a window of at least a window circuit board;

(B) connecting electrically the photosensitive element with the window circuit board; and (C) integrally forming a packaging body with a non-photosensitive area of the photosensitive element and the window circuit board, wherein a light window is defined in the packaging body above a photosensitive area of the photosensitive element correspondingly to define a photosensitive path for the photosensitive element.

In some embodiments, in the step (C), the photosensitive element and the window circuit board contact with each other, and the packaging body integrally connects the photosensitive element with the window circuit board.

In some embodiments, in the step (C), the photosensitive element and the window circuit board provide a gap between each other, and the packaging body is integrally connected and filled between the gap between photosensitive element and the window circuit board to strengthen the connection of photosensitive element and the window circuit board.

In some embodiments, in the step (C), a medium is provided between the photosensitive element and the window circuit board to indirectly connect the photosensitive element with the window circuit board, and the packaging body integrally packages the photosensitive element, the medium and the window circuit board to form an integral body.

Additional advantages and features of the invention will become apparent from the description which follows, and may be realized by means of the instrumentalities and combinations that particular point out in the appended claims.

DETAILED DESCRIPTION OF THE PREFERRED EMBODIMENT

Figure 1:
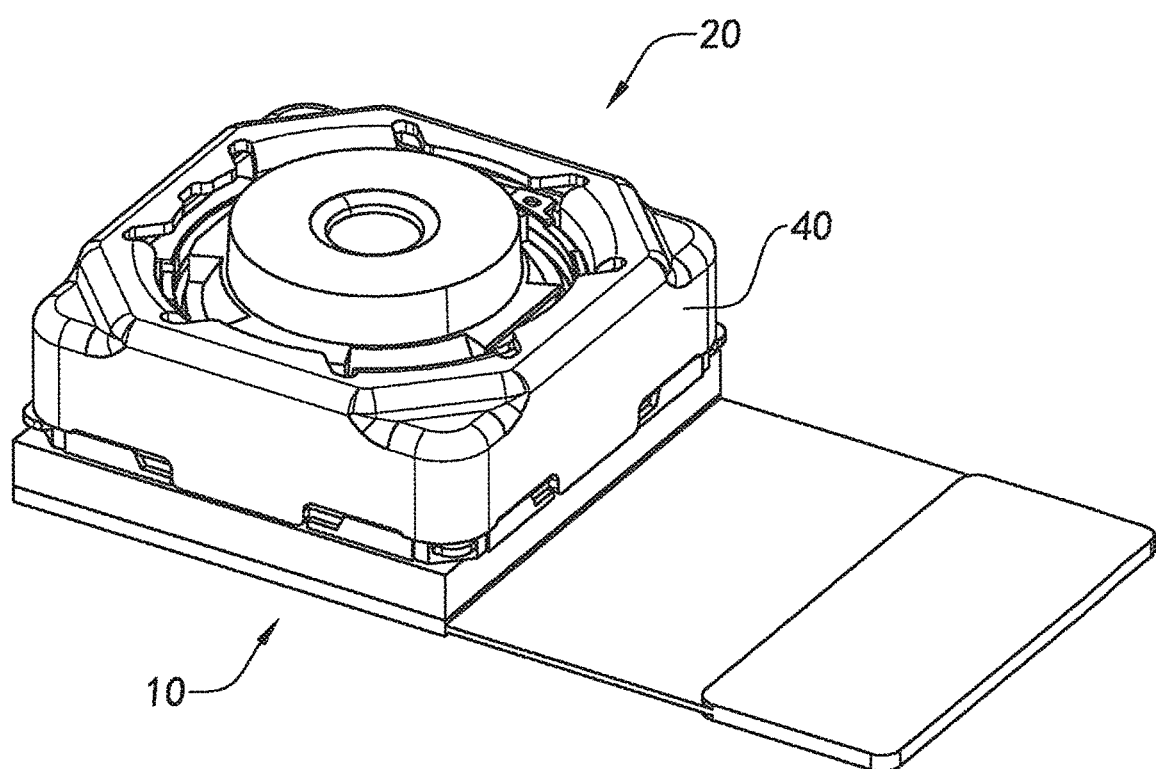
FIG. 1 is a perspective view of a camera module according to a first preferred embodiment of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be understood by those skilled in the art that the orientation or position relationship indicated by the terms "longitudinal", "transverse", "up", "low", "front", "rear", "left", "right", "vertical", "horizontal", "top", "bottom", "inner", "outer" and so on is based on the orientation or position relationship shown in the accompanying drawings, which is merely for convenience in describing the present invention and simplifying the description, and not to indicate or imply that the device or element referred to must be of a particular orientation, constructed and operated in a particular orientation. Therefore, the above-mentioned terms should not be regarded as limitations to the present invention.

Referring to FIGS. 1 to 4, a camera module according to a first preferred embodiment of the present invention is illustrated. The camera module comprises at least one photosensitive assembly 10, at least one lens 20 and at least one optical filter 30.

The optical filter 30 is installed on the photosensitive assembly 10 and positioned at a light sensing path (photosensitive path) of the photosensitive assembly 10. The lens 20 is positioned along the light sensing path of the photosensitive assembly 10. For example, during image acquisition, the light reflected from the target enters into the interior of the camera module through the lens 20, and then the light is optically treated by the lens 20 and the filter 30 and reaches the photosensitive assembly 10, wherein after the light is sensed by the photosensitive assembly 10, a photoelectric conversion is processed and the light signal is converted into an electrical signal, which is transmitted to the electronic apparatus employing the camera module by the photosensitive assembly 10 to achieve a reproduction of an image, that is, to complete an image acquisition process of a target.

Further, the camera module may further include at least one driver 40, wherein driver 40 is mounted on the photosensitive assembly 10 while the lens 20 is installed within the driver 40 so as to position the lens 20 at the light sensing path of the photosensitive assembly 10 so that the focal length of the camera module can be adjusted by the driver 40. The driver 40 may be implemented as a motor, such as, but not limited to, a voice coil motor, a piezoelectric motor, and the like. In other words, in this first embodiment of the present invention, the camera module is an Automatic Focus Model (AFM). Of course, in other embodiments of the present invention, the camera module may also be other types, such as a Fix Focus Model (FFM). It should be understood by those skilled in the art that the camera module of the present invention should not be limited to the above-mentioned types.

The optical filter 30 may be an infrared cut filter, a wafer level infrared cutoff filter, or a blue glass filter. It should be understood by those skilled in the art that the filter 30 of the present invention should not be limited to the above-mentioned types of optical filter.

The photosensitive assembly 10 includes at least one photosensitive element 11, at least one window circuit board 12 and at least one ring shaped packaging body 13. The photosensitive element 11 and the window circuit board 12 are spatially overlapped, for example the photosensitive element 11 is embodied to be received within a window of the window circuit board 12, so as to reduce the relative height or overall thickness of the photosensitive element 11 and the window circuit board 12, wherein the photosensitive element 11 and the window circuit board 12 are integrally packaged by the packaging body 13.

The packaging body 13 has at least one light window 134 for providing a light path for the photosensitive element 11. In other words, the light entered into the lens 20 passes through the light window 134 and reaches the photosensitive element 11 for photo-electrical conversion.

In this first embodiment of the present invention, the packaging body 13 has a ring shape and a step-shaped inner side structure to function as an installation site to facilitate the installation of the optical filter 30 thereon. Of course, the step-shaped inner side structure may also be used for mounting the driver 40 and/or the lens 20 thereon. It should be understood by those skilled in the art that the components to be mounted in the packaging body 13 are not limiting in the present invention.

The photosensitive element 11 includes a top surface 111 and a bottom surface 112. The top surface 111 of the photosensitive element 11 faces the lens 10 for photoelectric conversion.

Further, the photosensitive element 11 is configured to have a photosensitive area 1111 and a non-photosensitive area 1112 on its top surface 111, wherein the photosensitive area 1111 is configured to sense light, and the non-photosensitive area 1112 is adapted for electrically connecting to the window circuit board 12 to transmit the electrical signal produced by the photoelectric conversion of the photosensitive area 1111 to the window circuit board 12. In one embodiment, the photosensitive element 11 may be implemented as a square CCD or CMOS chip, and the non-photosensitive area 1112 is provided surrounding the periphery of the photosensitive area 1111. The window circuit board 12 may include an embedded circuit for processing an electrical signal transmitted by the photosensitive element 11.

The packaging body 13 integrally packages at least a portion of the non-photosensitive area 1112 of the photosensitive element 11. In other words, the packaging body 13 may partially package the non-photosensitive area 1112 of the photosensitive element 11, or completely package the non-photosensitive area 1112 of the photosensitive element 11.

The photosensitive element 11 is electrically connected to the window circuit board 12 through one or more electrical connectors 14, so as to conduct electrical signal transmission between the photosensitive element 11 and the window circuit board 12. The electrical connectors 14 may be embodied as lead wires made of gold, silver, copper, aluminum, or conductive non-metal, such as, but not limited to, gold wire, silver wire, copper wire, and aluminum wire. In one manufacturing method, the electrical connectors 14 are provided on the photosensitive element 11 and the window circuit board 12 by a WB (Wired/Bond) process. Further, the one or more electrical connectors 14 connect the non-photosensitive area 1112 of the photosensitive element 11 with the window circuit board 12.

The photosensitive assembly 10 includes one or more electronic components 123 protruding from the window circuit board 12. The one or more electronic components 123 are electrically connected with the window circuit board 12. The electronic component 123 may be a resistor, a capacitor, a driver, a signal processing element, a storage element, or the like. The electronic component 123 can be an electronic component 123 of the window circuit board 12 to achieve the electrical signal transmission. In other embodiments, the one or more electronic components 123 may not be protruded from the window circuit board 12 or the one or more electronic components 123 can be embedded in the window circuit board 12. It should be understood by those skilled in the art that the type or set mode of the electronic components 123 does not limit the scope of the present invention.

The electronic components 123 and the electrical connectors 14 are packaged in the packaging body 13. In other words, the electrical connectors 14 and the electronic components 123 are wrapped and enclosed by the packaging body 13 and not to be exposed to the external environment. In the conventional camera module, the connecting gold wires and the RC (resistance-capacitance) devices are usually exposed to the external environment and thus, on the one hand, the dust contaminated on the gold wires and the resistance-capacitance elements will adversely influence the imaging quality of the camera module. In addition, spaces are required to be reserved and provided for the gold wires and the resistance-capacitance elements on the circuit board and the independent holder for installing the optical filter and lens is required to be adhered on the outer open area around the gold wires and the resistance-capacitance elements on the circuit board of the camera module, which results in a waste of space of the camera module.

The window circuit board 12 includes a board body 121 and has a window 122 formed in the board body 121. In other words, the window 122 is indently provided in the board body 121 to form a window-shaped circuit board. The photosensitive element 11 is received in the window 122 so as to reduce the thickness occupied by the photosensitive element 11 which is attached on top of the circuit board as in the conventional camera module.

That is, the photosensitive element 11 is spatially overlapped with the window circuit board 12 by downwardly positioning in the indented window 122 of the window circuit board 12 such that the photosensitive element 11 is placed inside the board body 121 so that an overall height or thickness the photosensitive element 11 and the board body 121 is reduced to simply the thickness of the board body 121 or slightly thicker than the board body 121 in comparison with the conventional camera module that the overall height is the thickness of the circuit board plus the thickness of the photosensitive element attached on top of the circuit board. When the top surface 111 of the photosensitive element 11 is not higher than the top surface 1211 of the board body 121 (i.e. the thickness of the photosensitive element is smaller than a depth of the window 122 in the board body 121), the board body 121 provides a sufficient space in the window 122 for the photosensitive element 11 to be installed therein, and the overall height of the photosensitive element 11 and the board body 121 is merely as the height of the board body 121.

The board body 121 has a top surface 1211 and a bottom surface, the packaging body 13 is arranged to be packaged on the top surface 1211 of the board body 121 and extended to be packaged on the non-photosensitive area of the top surface 111 of the photosensitive element 11. The size of the window 122 of the window circuit board 12 may be configured in accordance with the size of the photosensitive element 11 and may be equivalent to the size of the photosensitive element 11 to make the window 122 be adapted to fittingly receive the photosensitive element 11 therein, or may be larger than the above-mentioned photosensitive element 11 so as to receive the photosensitive element 11 therein while enabling an adjustment of the position of the photosensitive element 11 in the window 122. In one implementation, a gap 125 may be provided between the photosensitive element 11 and the window circuit board 12 to facilitate the photosensitive element 11 to be mounted and affixed with the window circuit board 12 by filling the gap 125 with the packaging material during the molding and packaging process. In other words, the packaging body 13 is extended into the gap 125 formed between the photosensitive element 11 and the window circuit board 12. In one embodiment, the packaging body 13 extends into the gap 125 to fill the space between the board body 121 and the photosensitive element 11 that not only increases the top surface area, i.e. the installation surface area, of the packaging body 13, but also connects and bonds the outer side edges of the photosensitive element 11 with the inner side edges, which defines the window 122, of the board body 121. Also, the packaging body 13 extended into the gap 125 to bond with the photosensitive element 11 and the window circuit board 12 to form an integral body while the bottom surface 112 of the photosensitive element 11 and the bottom surface 1212 of the board body 121 are substantially formed at the same level. Thus, in other words, the packaging body 13 substantially reinforces the photosensitive element 11 and the window circuit board 12, as shown in FIG. 3.

Figure 2:
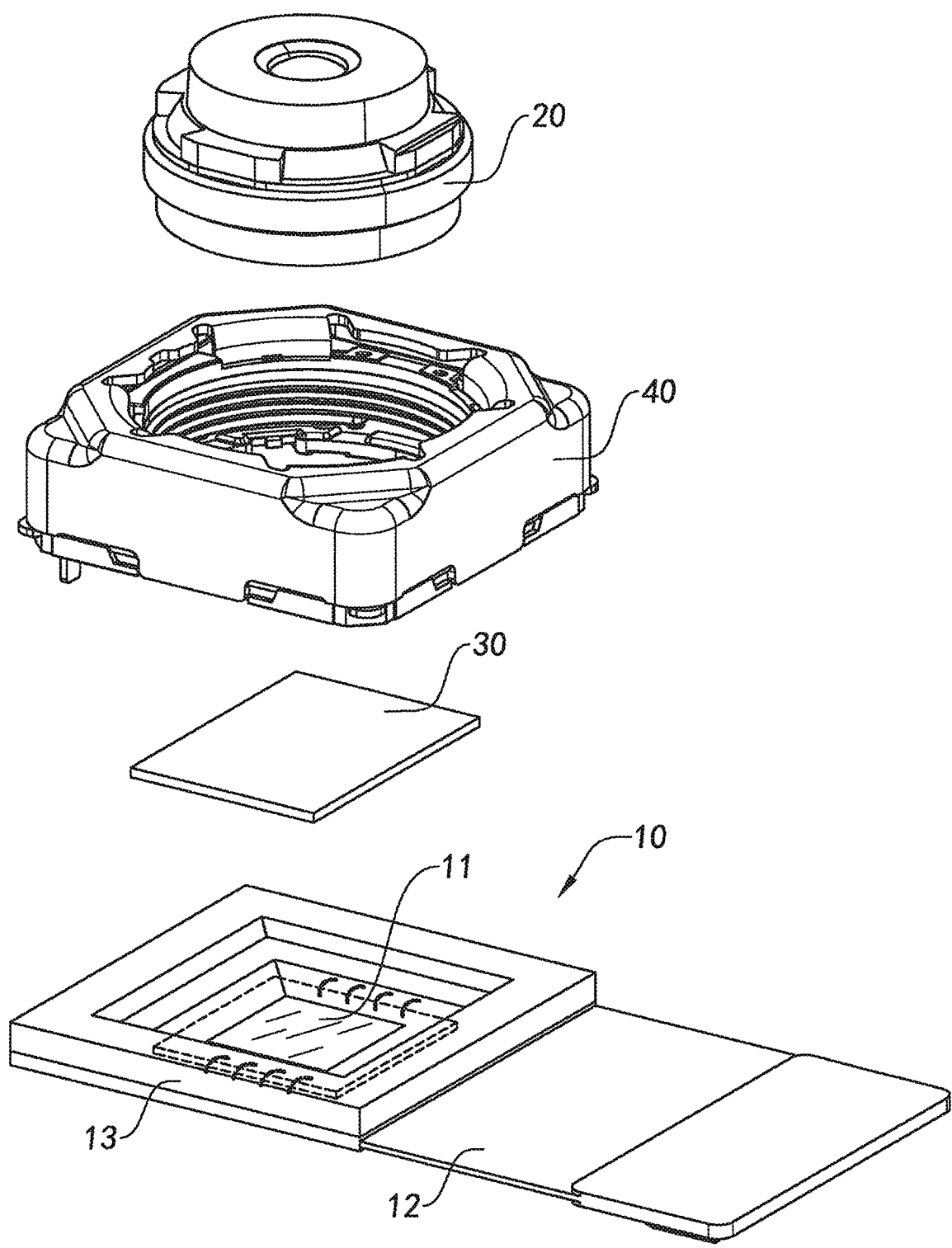
FIG. 2 is an exploded perspective view of the camera module according to the above first preferred embodiment of the present invention.
Figure 3:
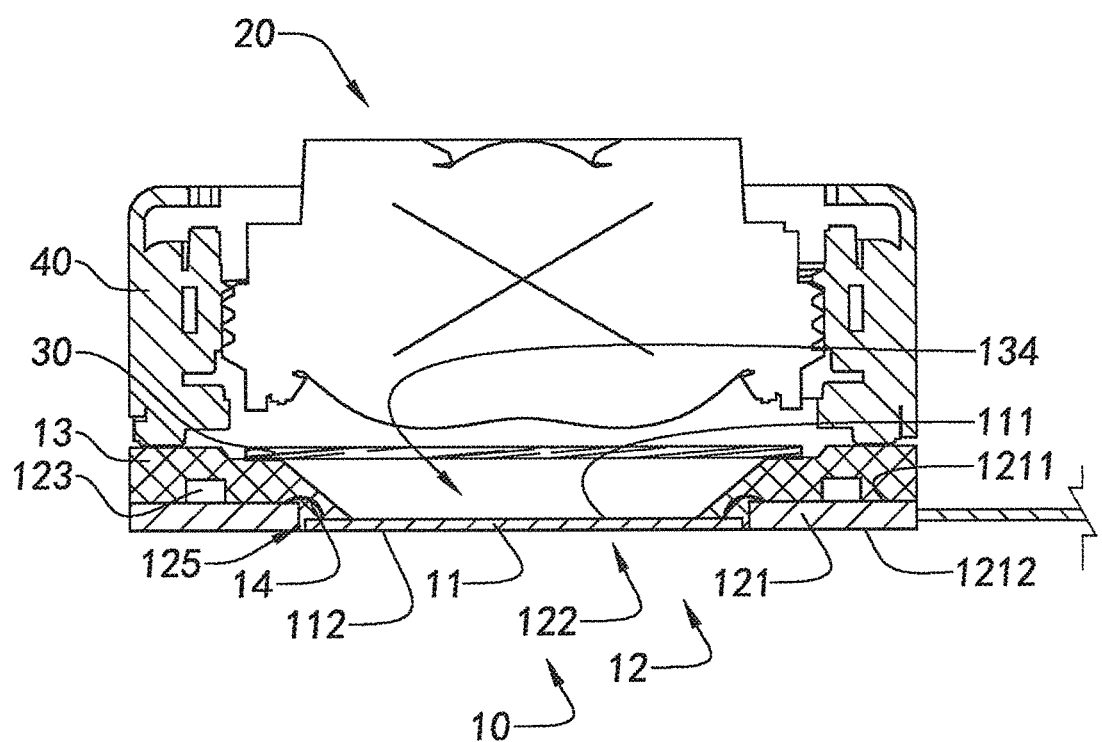
FIG. 3 is a sectional view of the camera module according to the above first preferred embodiment of the present invention.
Figure 4:
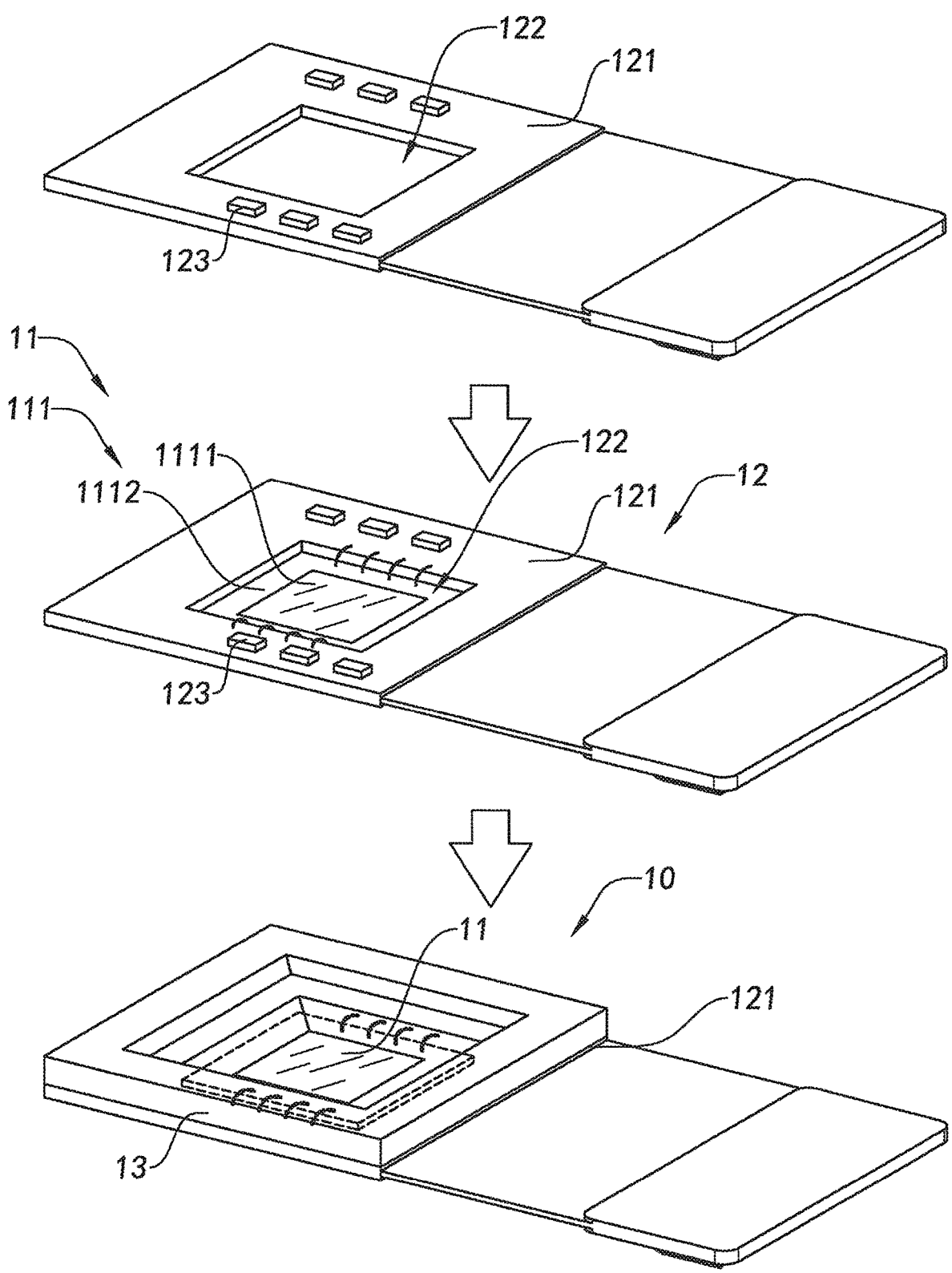
FIG. 4 illustrates a manufacturing process of the photosensitive assembly of the camera module according to the above first preferred embodiment of the present invention.

It is worth mentioning that, as shown in FIGS. 1-3, the light window 134 of the packaging body 13 is defined by a step-shaped inner wall of the packaging body 13, wherein a top receiving groove is formed on the packaging body 13 as installation site for the optical filter 30 being installed and received therein, and then the inner wall of the packaging body 13 is inwardly and inclinedly extended to the non-photosensitive area 1112 of the photosensitive element 11 to form the light window 134 above the photosensitive area 1111 of the photosensitive element 11 to form the light sensing path (photosensitive path) of the photosensitive assembly 10. The inclined wall of the light window 134 gradually increases the size of the light window from the photosensitive element 11 that can substantially reflect the light projected onto the inclined wall of the light window 134 away from the photosensitive element 11 so as to reduce the adverse influence of the reflected stray light on the imaging quality of the camera module of the present invention.

Figure 5A:
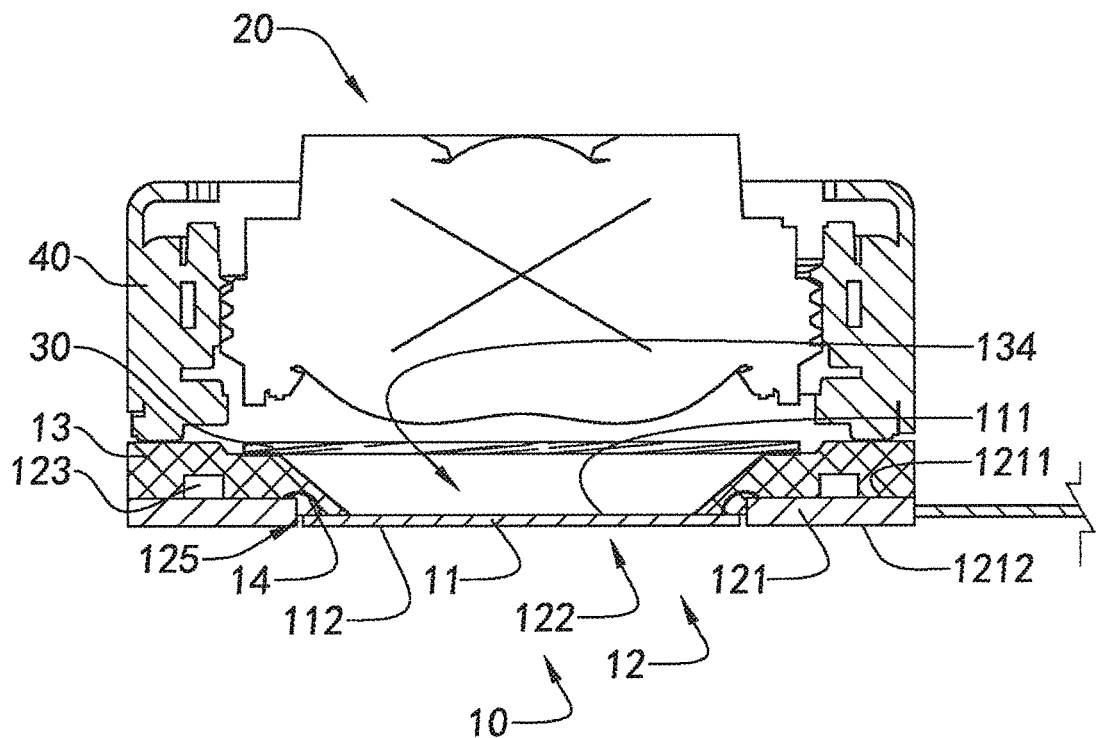
FIGS. 5A and 5B illustrate alternatives of the packaging body of the camera module according to the above first preferred embodiment of the present invention.
Figure 5B:
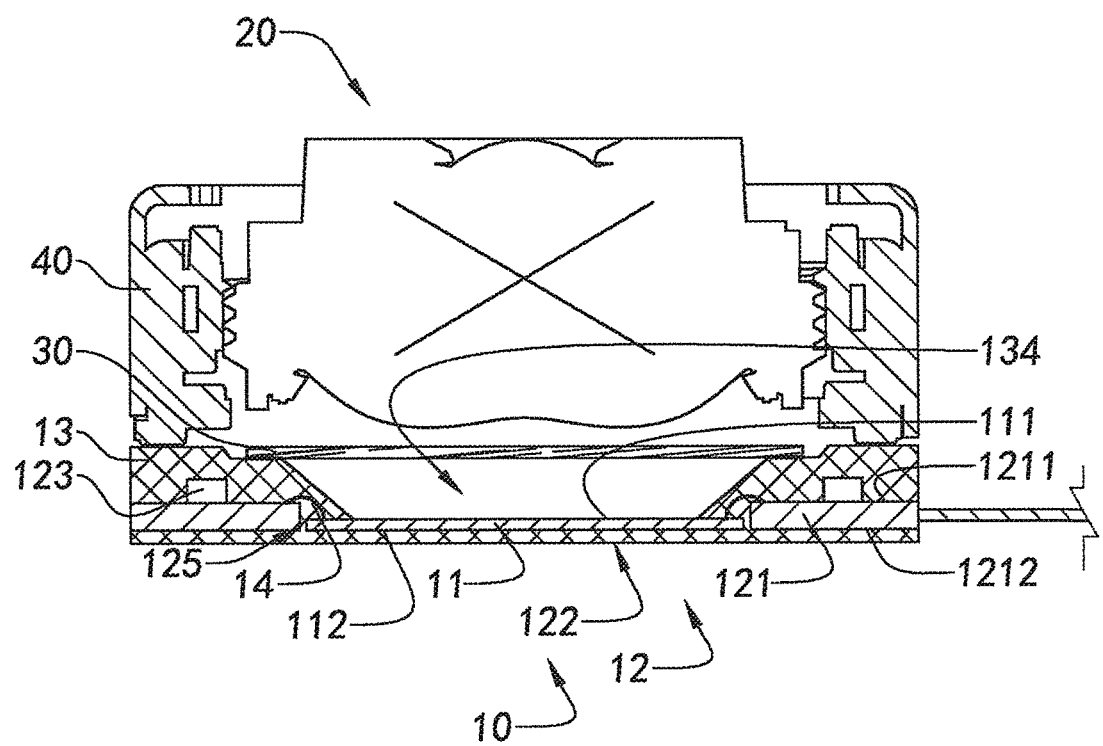

Referring to FIG. 5A, the packaging body 13 can be alternatively made not to extend into and fill the gap 125, while the heights of the packaging body 13, the top surface 111 of the photosensitive element 11 and the top surface 1211 of the board body 121 are respectively the same as the above first embodiment as shown in FIGS. 1-3, wherein, in the implementation, the photosensitive element 11 and the board body 121 are adhered by an adhesive, such as filling adhering glue in the gap 125, to prevent the packaging body 13 from extending into the gap 125. As shown in FIG. 5B, the packaging body 13 can also alternatively made not only extending into the gap 125, but also passing through the gap 125 and wrapping the bottom of the photosensitive assembly 10 to form a bottom layer of the packaging body 13 covering both the bottom of the photosensitive assembly 10 and the bottom of the window circuit board 12. It should be understood by those skilled in the art that the gap and the relationship between the packaging body and the gap may be adjusted and configured as desired, and the size of the gap and the formation of the packaging body 13, including the extension portion in the gap, are exemplary but not intending to limit the scope of the present invention.

It is worth mentioning that, in another alternative, the board body 121 may be in direct contact with the photosensitive element 11 and form no gap therebetween, rather than be spaced from the photosensitive element 11 to form the gap 125 therebetween. It is worth mentioning that when the packaging body 13 reinforces the window circuit board 12 and the photosensitive element 11, it does not even require an additional reinforcing plate provided at the bottom of the circuit board, wherein the packaging body 13 itself serves to reinforce the window circuit board. Of course, the back side of the window circuit board 12 of the present invention may also be provided with a reinforcing plate to enhance the package strength of the photosensitive assembly.

According to manufacturing process of the photosensitive assembly 10 of the present invention, it comprises the steps of windowing a circuit board substrate to form the window circuit board 12 having the window 122, arranging the photosensitive element 11 in the window 122 (the photosensitive element 11 and the window circuit board 12 may be initially connected by adhering glue), connecting electrically the photosensitive element 11 with the board body 121 by the one or more electrical connectors 14, for example, by a bonding manner, and integrally packaging the no-photosensitive area 1112 of the photosensitive element 11, the one or more electrical connectors 14, the one or more electronic components 123, and the window circuit board 12 in an integrally packaging manner to form the photosensitive assembly 10 of the present invention.

The material of the board body 121 may be RG (Rigid Flex), FPC (Flex Print Circuit), PCB (Printed Circuit Board), ceramic substrate (without soft board), and so on.

It is worth mentioning that the package area of the non-photosensitive area 1112 of the photosensitive element 11 may be configured as required, that is, the non-photosensitive area 1112 may be completely or partially packaged. It should be understood by those skilled in the art that the size and shape of the package area is not intended to limit the present invention.

In the present invention, the packaging body 13 is integrally formed by a molding process (Molding), which is different from the conventional independent base or holder that is adhered or bonded to a circuit board. When the photosensitive assembly 10 is manufactured, the photosensitive element 11 and the window circuit board 12 are put into a mould, and then the molding material is fed into the mould, wherein after the molding material is solidified and cured to form the packaging body 13 having a predetermined shape, the photosensitive element 11 and the window circuit board 12 is integrally fixed by the packaging body 13. The molding material may be selected from the materials of nylon, LCP (Liquid Crystal Polymer), PP (Polypropylene), epoxy resin, and other thermoplastic or thermosetting materials.

This integrated package reduces the process of the conventional glue-bonding of the independent base or holder, and the packaging body 13 is manufactured by molding, wherein its shape is more easily controlled and the surface flatness is better formed, so as to provide a flat mounting condition for the optical filter 30, the driver 40 and the lens 20 and ensure the optical axes of the lens, the optical filter and the photosensitive element of the camera module to be aligned coaxially. On the other hand, it eliminates the conventional glue bonding space that further reduces the height of the camera module. Furthermore, according to the embodiments of the present invention, the photosensitive element 11 is provided in the window 122 and then integrally packaged by the packaging body 13, so that when the packaging body 13 is formed, the thickness of the photosensitive element 11 will not increase the overall thickness of the photosensitive assembly 10, which further provides a possibility of reducing the height of the camera module.

To view the packaging body from the top, its shape can be, but not limited to, a circular shape, a square shape, a circle shape, or a triangle shape, in order to provide mounting positions for the optical filter 30, the lens 20 and/or the driver 40, so that when lens 20 or the driver 40 is mounted on the packaging body 13, an enclosed internal environment is formed. And, the flatness of the surfaces of the packaging body 13 can be ensured due to the advantages of the integrated packaging of the mould, so as to provide a better flat mounting condition for the filter 30, the lens 20 or the driver 40.

According to the above preferred embodiment and its alternatives of the present invention, the window 122 is embodied as a through hole, that is the window 122 communicates both sides of the board body 121 with each other, so as to provide a space enabling the adjustment of the installation position of the photosensitive element 11 in all directions. In other words, the relative position of the photosensitive element 11 in the window 122 and the board body 121 can be configured as necessary.

It is worth mentioning that, in the present invention, the photosensitive element 11 and the window circuit board 12 are integrally packaged by the packaging body 13 so that when the photosensitive element 11 is disposed in the window 122, no additional supporting component is required to affix the photosensitive element 11, so that the position of the photosensitive element 11 can be relatively and freely selected. In other words, the packaging body 13 provides a fixing function for the photosensitive element 11 and the board body 121 that integrally connects the photosensitive element 11 and the board body 121 from the top thereof. Therefore, the conventional supporting or fixing means for the circuit board body and other components, from the top or other directions, for example underneath, is not needed to use to support the photosensitive element 11. In addition, the structural strength of the board body 121 of the window circuit board 12 and the photosensitive element 11 can be enhanced by the integrated packaging of the packaging body 13.

Further, according to the first embodiment of the present invention, the photosensitive element 11 may be positioned closer to an upper portion of the window 122, so that one end of each of the electrical connectors 14 is easier to be connected to the non-photosensitive area 1112 of the photosensitive element 11 while the another end of the respective electrical connector 14 extending across the periphery of the window 122 and connecting to the board body 121.

Further, the bottom surface 112 of the photosensitive element 11 and the bottom surface 1212 of the board body 121 are positioned on the same level so that the bottom of the photosensitive assembly 10 and the bottom of the board body 121 form a flat bottom surface of the photosensitive assembly 10. In other words, the bottom surface 112 of the photosensitive element 11 and the bottom surface 1212 of the board body 121 are substantially flatly aligned with each other.

In this manner, the bottom surface 112 of the photosensitive element 11 is exposed to outside to improve the heat-dissipating function of the photosensitive element 11, that is different from the conventional way that the photosensitive element is attached on the circuit board that the bottom surface of the photosensitive element which is blocked by the circuit board has a poor thermal dissipating performance.

For example, the present invention provides two methods of manufacturing the window circuit board 12. One method comprises the steps of windowing the window 122 in a substrate layer, wherein the size of the window 122 is determined in accordance with the size of the photosensitive element 11, overlapping the windowed substrate layer with another substrate layer and embedding a circuit between the two substrate layers so as to form the window circuit board 12 having the window 122. In another method, the substrate layers are overlappedly arranged, and the circuit is embedded between the substrate layers in a predetermined route, wherein the embedding route is determined according to the installation position of the photosensitive element 11, and then windowing the overlapped substrate layers to form the window 122 which is surrounded by the embedded circuits and determined in accordance with the shape and size of the photosensitive element 11 without damaging the circuit.

Figure 6:
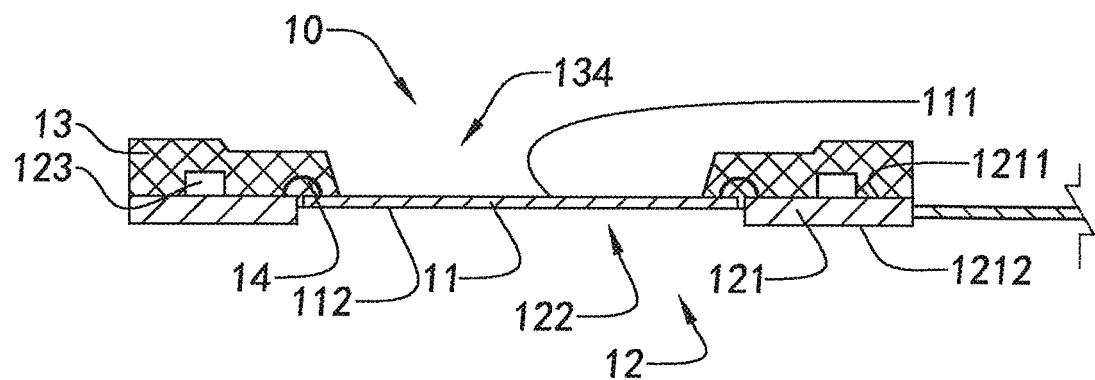
FIG. 6 illustrates a first alternative mode of the photosensitive assembly of the camera module according to the above first preferred embodiment of the present invention.

As shown in FIG. 6, a first alternative mode of the first embodiment of the present invention is illustrated, wherein the photosensitive assembly 10 of the camera module is different from the above first embodiment that, the top surface 111 of the photosensitive element 11 is aligned with the top surface 1211 of the board body 121 on the same level. That is, the top surface 111 of the photosensitive element 11 is substantially flatly aligned with the top surface 1211 of the board body 121 to reserve a space below the photosensitive element 11, wherein under the condition of the top surfaces 111, 1211 of the photosensitive element 11 and the board body 121 being flatly aligned with each other, the photosensitive element 11 and the window circuit board 12 are electrically connected by the one or more electrical connectors 14.

During the manufacturing process of the photosensitive element 11, a boss-shaped smelting device may be provided for supporting the photosensitive element 11 to ensure the top surface 111 of the photosensitive element 11 is flatly aligned with the top surface 1211 of the window circuit board 12, and then the photosensitive element 11 and the window circuit board 12 are integrally packaged to form the packaging body 13 so that the relative positions between the photosensitive element 11 and the window circuit board 12 is fixed by the packaging body 13.

Figure 7:
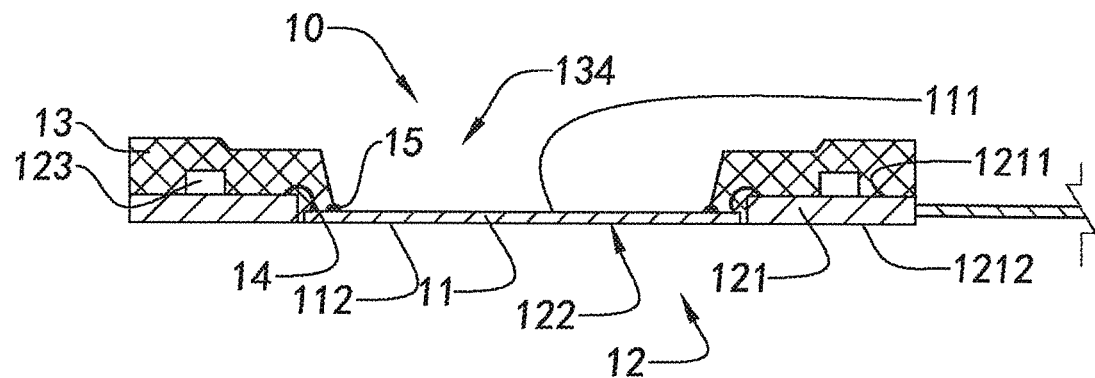
FIG. 7 illustrates a second alternative mode of the photosensitive assembly of the camera module according to the above first preferred embodiment of the present invention.

As shown in FIG. 7, a second alternative mode of the first embodiment of the photosensitive assembly 10 of the camera module is illustrated, wherein the difference between this second alternative mode and the first embodiment is that, the photosensitive element 11 includes a blocking member 15, wherein the blocking member 15 is provided at a position where the packaging body 13 and the photosensitive element 11 are in contact with each other to prevent the packaging body 13 from extending to the inside of the photosensitive element 11, avoiding any contamination of the photosensitive area 1111 of the photosensitive element 11. That is, the blocking member 15 is provided outside of the photosensitive area 111 to prevent the liquid form molding material from flowing to the photosensitive area 1111, during the molding process of the packaging body 13, and protect the photosensitive element 11 during the packaging operation of the mould.

The blocking member 15 is configured to be ring-shaped or frame-shaped, wherein the blocking member 15 is provided on the photosensitive element 11. That is, the position where the inner edge of the packaging body 13 and the photosensitive element 11 are in contact with each other is blocked by the blocking member 15.

The blocking member 15 may be formed of a colloid or may be a plastic element having a predetermined shape.

During the manufacturing process of the photosensitive assembly 10, before the photosensitive element 11 and the window circuit board 12 are integrally packaged, it is preferred to attach the blocking member 15 on the photosensitive element 11, for example, by coating glue, so as to define the packaging body 13, with regarding the blocking member 15 as a boundary, and enable the material for the packaging body 13 not to contaminate the photosensitive area 1111 of the photosensitive element 11. In other words, the packaging body 13 is provided from an inner edge of the blocking member 15 and extended outwardly to encapsulate and package at least a portion of the non-photosensitive area 1112 of the photosensitive element 11, and the electrical connectors 14, the window circuit board 13.

Figure 8:
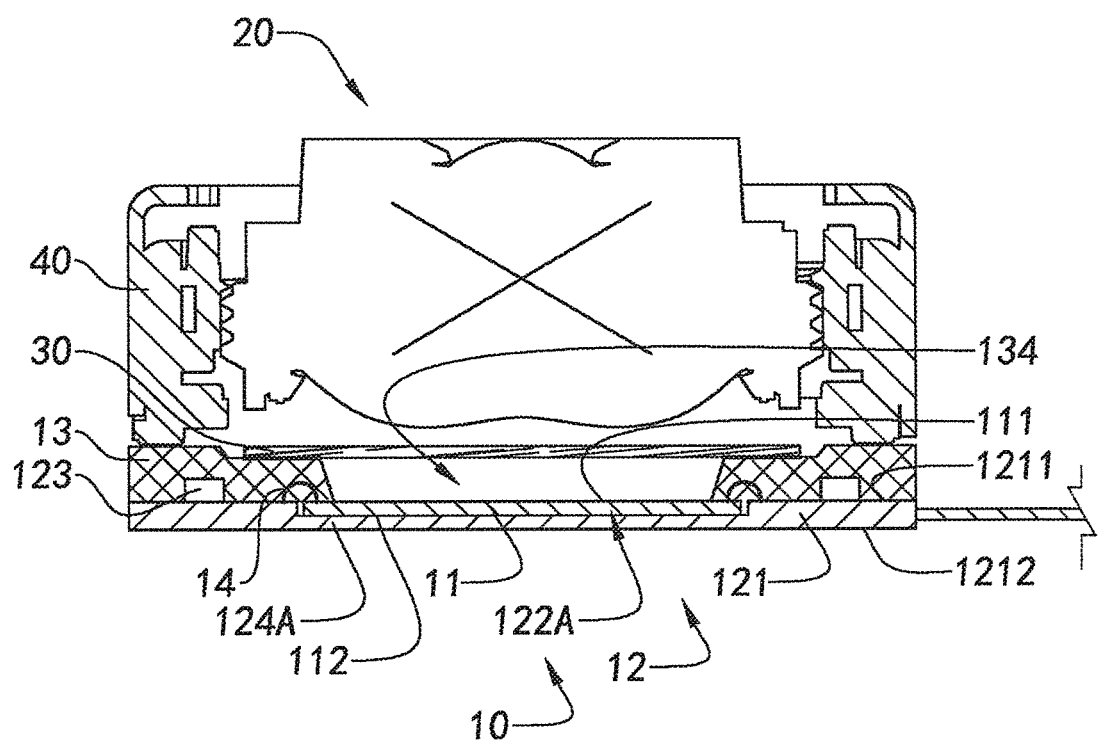
FIG. 8 is a perspective view of a camera module according to a second preferred embodiment of the present invention.
Figure 9:
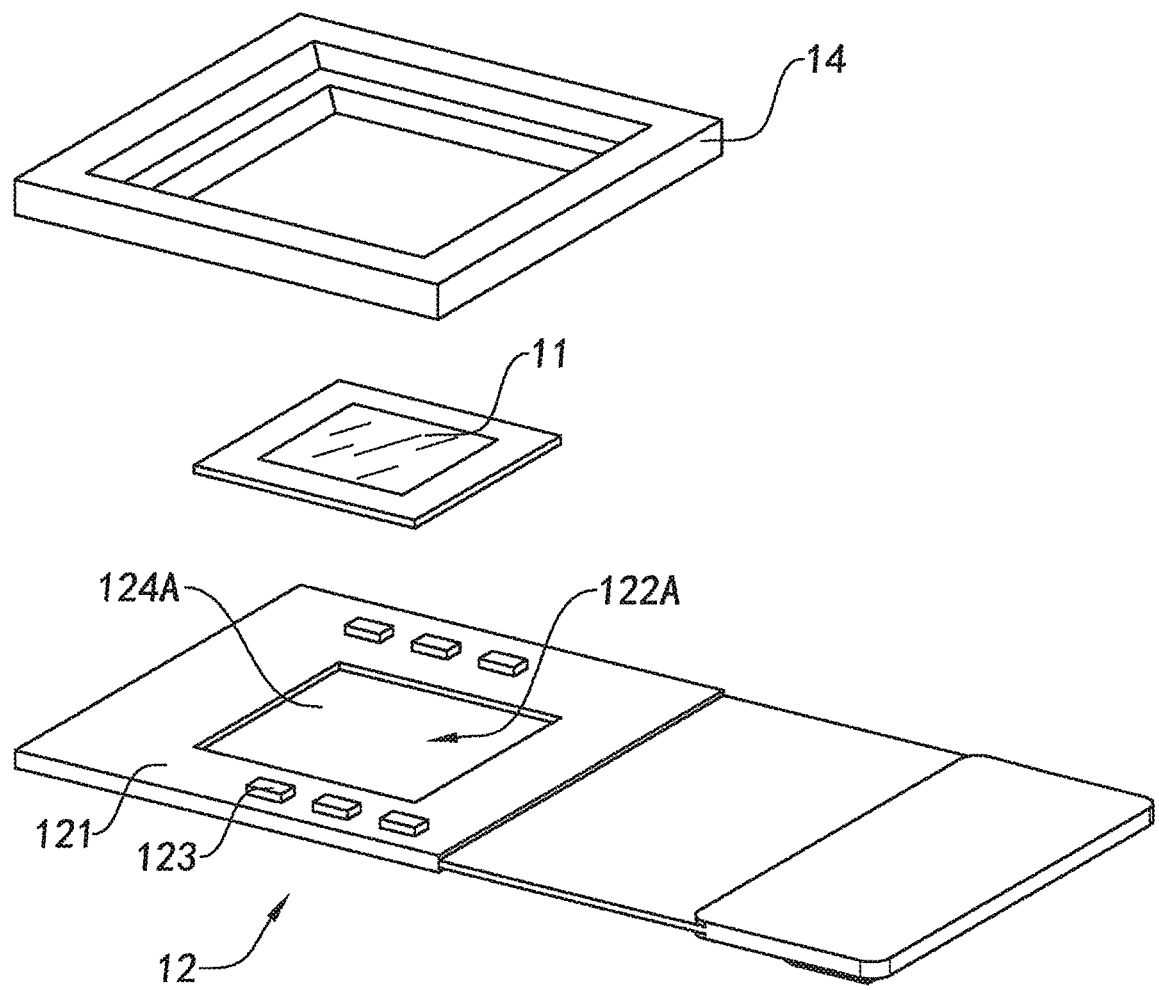
FIG. 9 is an exploded perspective view of the photosensitive assembly of the camera module according to the above second preferred embodiment of the present invention.

Referring to FIGS. 8 and 9, a camera module according to a second preferred embodiment of the present invention is illustrated. The different between this second embodiment and the above first embodiment is that the window 122A is a recess configuration, wherein the photosensitive element 11 is received and installed in the recess structure so that the overall height of the photosensitive element 11 and the window circuit board 12 is reduced in comparison with the conventional way of attaching the photosensitive element on the circuit board. Further, when the depth of the recess structured window 122A is equal to or slightly larger than the thickness of the photosensitive element 11, the overall thickness of the photosensitive element 11 and the window circuit board 12 will be simply the thickness of the window circuit board 12.

The window 122A has a window bottom 124A and the photosensitive element 11 is mounted on the window bottom 124A. In other words, the window bottom 124A supports the photosensitive element 11. The size of the window 122A should match with the size of the photosensitive element 11 so that the top surface of the photosensitive element 11 is preferred to be aligned with the top surface of the board body 121 on the same level. Of course, a gap may be provided between the photosensitive element 11 and the board body 121 and the photosensitive element 11 and the board body 121 can be fixed by an adhesive.

In this second embodiment of the present invention, the one or more electrical connectors 14 are electrically connected to the photosensitive element 11 and the board body 121. That is, the one or more electrical connectors 14 are connected with the top surface of the photosensitive element 11 disposed within the window 122A and the top surface of the circuit board 12 outside the window 122A.

Figure 10:
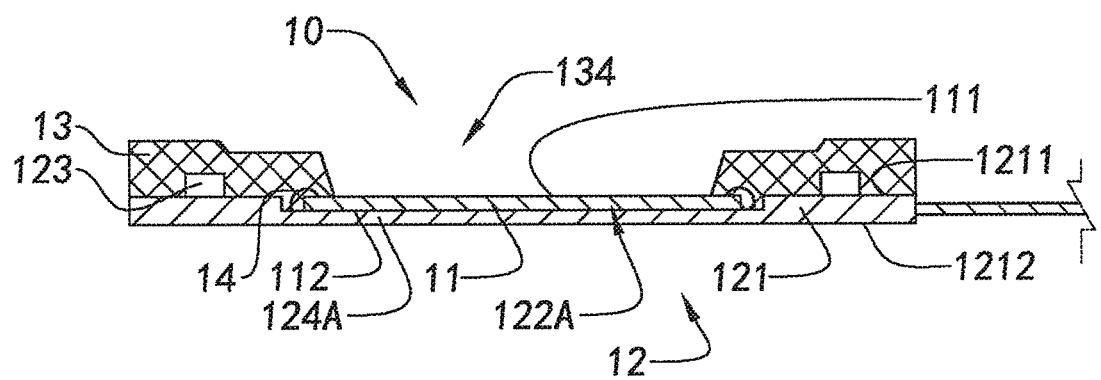
FIG. 10 illustrates an alternative mode of the photosensitive assembly of the camera module according to the above second preferred embodiment of the present invention.

As shown in FIG. 10, an alternative mode of photosensitive assembly 10 of the above second embodiment of the present invention is illustrated. The difference between this alternative mode and the above second embodiment is that the one or more electrical connectors 14 are disposed in the window 122A of the window circuit board 12 to connect the photosensitive element 11 with the window circuit board 12. Further, one end of each of the electrical connectors 14 is connected to the non-photosensitive area 1112 of the photosensitive element 11 and another end of the respective electrical connector 14 is connected to a recess surface on the window bottom 124A of the window 122A of the window circuit board 12, wherein the electrical connection between the electrical connectors 14 and the photosensitive element 11 is accomplished in a smaller space.

In comparison with the manufacturing process of the above first embodiment, the recess type window 122A of the second embodiment is more difficult to manufacture than the through hole type window 122. Since the thickness of the window circuit board 12 is small and a recess is needed to be formed in the circuit board to form the window circuit board 12, it requires a higher accuracy and the electrical connectors 14 are connected within the recess (recess type window 122A) while at least a portion of the circuit has to be printed on a thinner window bottom 124A of the window circuit board 12 that requires a higher accuracy to accomplish. Accordingly, a square shaped window 122A with the electrical connectors 14 connecting from the photosensitive element 11 to the portion of the window circuit board 12 outside the window 122A is preferred while providing more adjustable space for the photosensitive element 11 to positioned as well as a better thermal dissipating performance.

Figure 11:
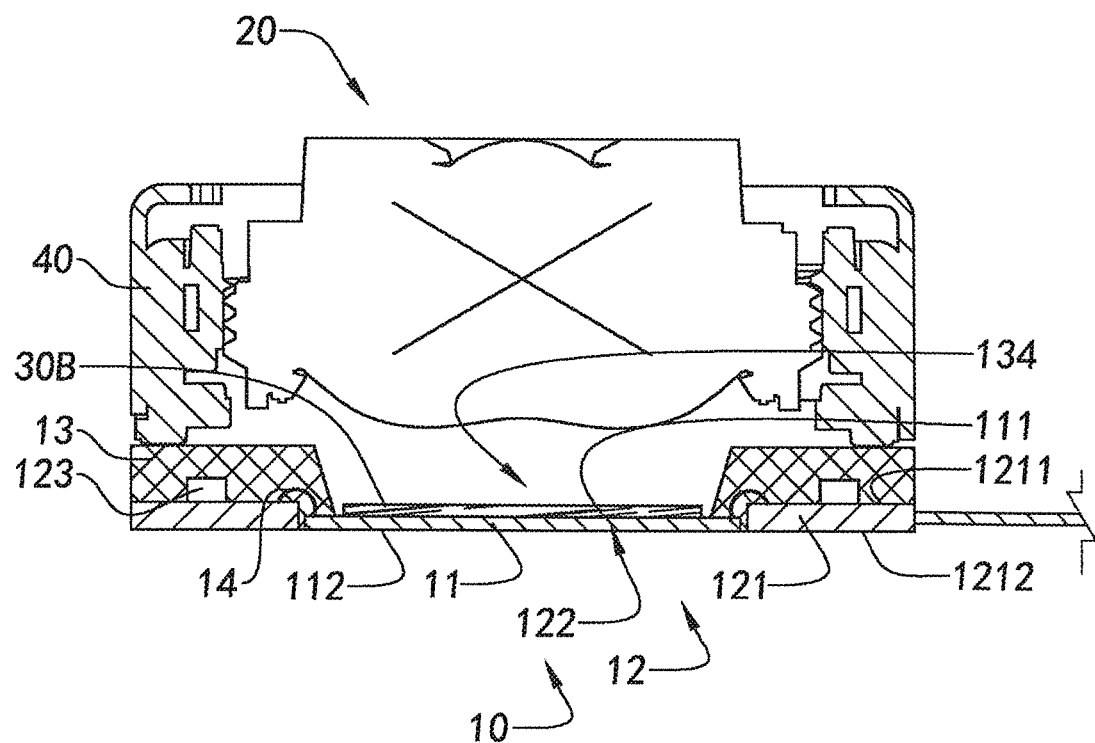
FIG. 11 is a sectional view of a camera module according to a third preferred embodiment of the present invention.
Figure 12:
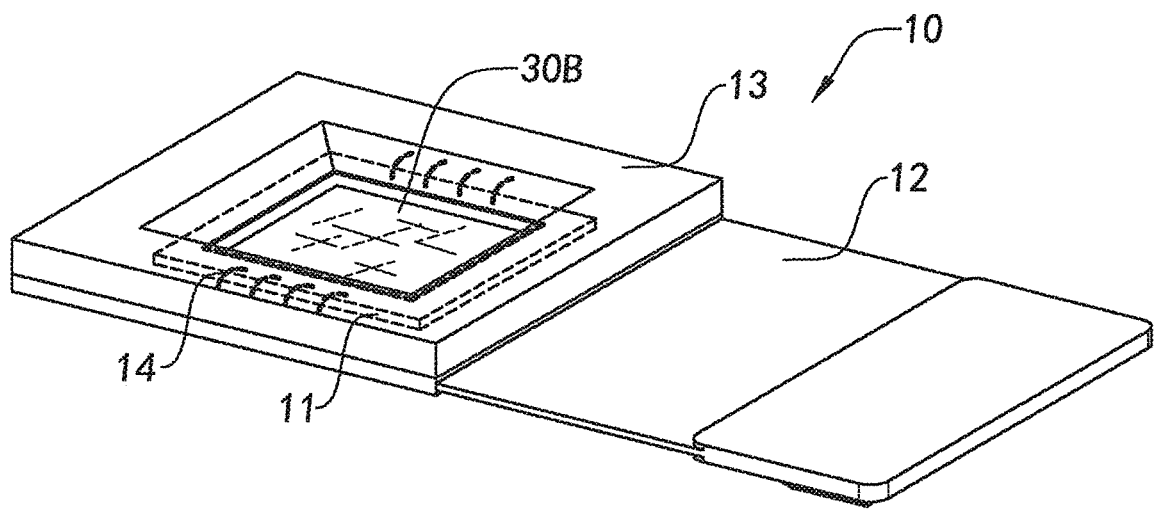
FIG. 12 is a perspective view of the photosensitive assembly of the camera module according to the above third preferred embodiment of the present invention.

As shown in FIGS. 11 and 12, a camera module according to a third preferred embodiment of the present invention is illustrated. The difference between this third embodiment and the above embodiments is that the photosensitive assembly 10 includes an optical filter 30B which is directly provided on the photosensitive element 11. That is, the optical filter 30B covers and shields the photosensitive element 11, so as to further reduce any possible contamination of the photosensitive element 11 and damage to the photosensitive element 11 resulting from the mould during the molding and packaging process.

In this third embodiment, the top surface of the packaging body 13 may be a flat and planar surface without the step structure for installing the optical filter as embodied in the above first and second embodiments, wherein the lens or the driver 40 is mounted on the packaging body 13.

For example, the optical filter 30B may be attached to the photosensitive element 11 by adhesive. In other embodiments, the optical filter 30B may also be disposed on the photosensitive element 11 by other attaching means, and it should be understood by those skilled in the art that the connection mode of the filter 30B and the photosensitive element 11 is not intended to limit the present invention.

In this manner, since the optical filter 30B is provided on top of the photosensitive element 11, the optical filter 30B is not required to be mounted on the packaging body 13 in the camera module. The distance between the optical filter 30B and the photosensitive element 11 is minimized in this third embodiment so that the back focus of the camera module is reduced that further reduces the height of the camera module.

In the manufacturing process of the photosensitive assembly 10 according to the third embodiment, before the photosensitive element 11 and the window circuit board 12 are integrally packaged, the optical filter 30B may be firstly attached on the photosensitive element 11 such that the photosensitive element 11 can be shielded by the optical filter 30B. In particular, the photosensitive area 1111 of the photosensitive element 11 is shielded and protected by the optical filter 30B so as to prevent the photosensitive element 11 from being contaminated by the packaging material of the packaging body 13 and improve the image quality thereof, during the molding and packaging process. Of course, in other embodiments of the present invention, the optical filter 30B may be attached on the photosensitive element 11 after the packaging body 13 is molded to form to reduce the back focal length of the camera module, and it should be understood by those skilled in the art that the sequence of installing the optical filter 30B is not intended to limit the present invention.

Figure 13:
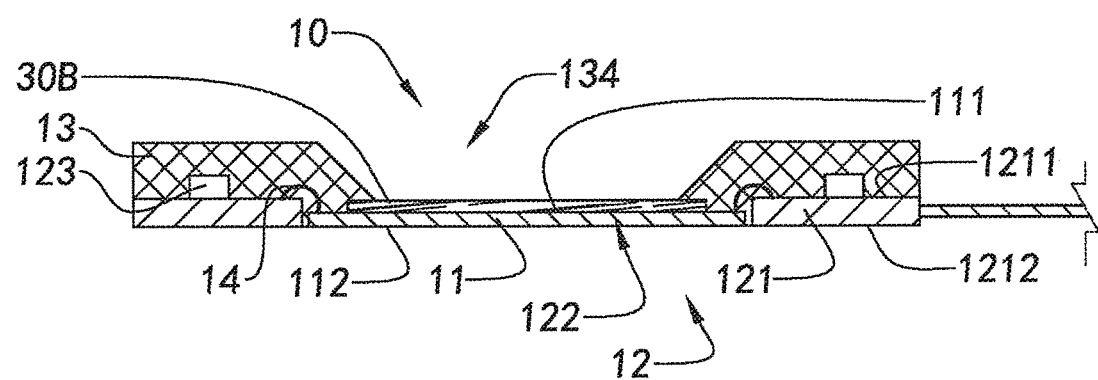
FIG. 13 illustrates an alternative mode of the photosensitive assembly of the camera module according to the above third preferred embodiment of the present invention.

As shown in FIG. 13, an alternative mode of the photosensitive assembly 10 of the camera module according to the third preferred embodiment of the present invention is illustrated, wherein the difference between this alternative mode and the above third embodiment is that, the photosensitive assembly 10 further includes an optical filter 30B attached on the photosensitive element 11 wherein the peripheral of the optical filter 30B that covers the non-photosensitive area 1112 of the photosensitive element 11 is also integrally packaged by the package body 13. That is, the photosensitive element 11, the window circuit board 12 and the optical filter 30B are integrally packaged by the packaging body 13 to form an integral body while affixing the optical filter 30B in position at the same time. In the manufacturing process of the photosensitive assembly 10 of this alternative mode, the optical filter 30B is overlappedly attached on the photosensitive element 11 by adhesive before the packaging body 13 is molded and packaged to form, or that the filter 30B may also be integrally molded and packaged in position on top of the photosensitive element 11 without such adhering step.

Figure 14:
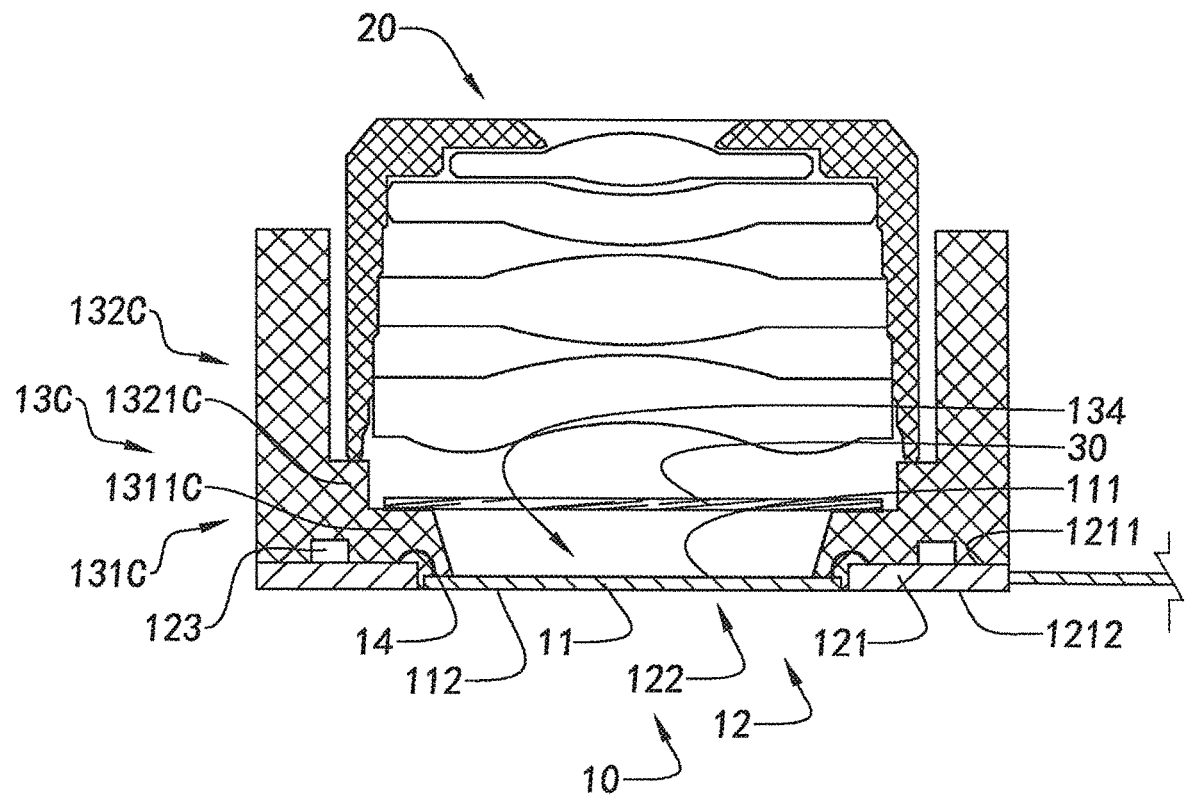
FIG. 14 is a sectional perspective view of a camera module according to a fourth preferred embodiment of the present invention.

As shown in FIG. 14, a camera module according to a fourth preferred embodiment of the present invention is illustrated. The difference between this fourth embodiment and the above embodiments is that the photosensitive assembly 10 includes a hollow packaging body 13C which comprises a holding portion 131C and a lens portion 132C. The holding portion 131C is configured for mounting the filter 30 thereat, and the lens portion 132C is upwardly extended for mounting the lens 20 therein.

Further, the lens portion 132C of the packaging body 13C extends integrally and upwardly from the holding portion 131C defining therein a receiving chamber which inner wall forms a stepped structure defining a ring shaped first supporting table 1311C at the holding portion 131C and a ring shaped second supporting table 1321C at the lens portion 132C, wherein the optical filter 30 is mounted on the first supporting table 1311C and the lens 20 is mounted on the second supporting table 1321C. In other words, the first supporting table 1311C and the second supporting table 1321C form a two-stepped structure.

The lens portion 132C is integrally extended to provide a stable mounting environment for the lens 20. According to this third embodiment of the present invention, the depth of the lens portion 132C can be determined in accordance with the height of the lens 20 for mounting the lens 20 stably therein, so as to improve the accuracy of the camera module.

According to the fourth embodiment, the packaging body 13C is made by molding and packaging to form an integral packaging body with a smooth and stable mounting environment for mounting the lens 20 therein form a fixed focus camera module.

Furthermore, in this fourth embodiment, the inner wall of the lens portion is made flatly which is suitable for mounting the non-threaded lens 20 thereon.

Figure 15:
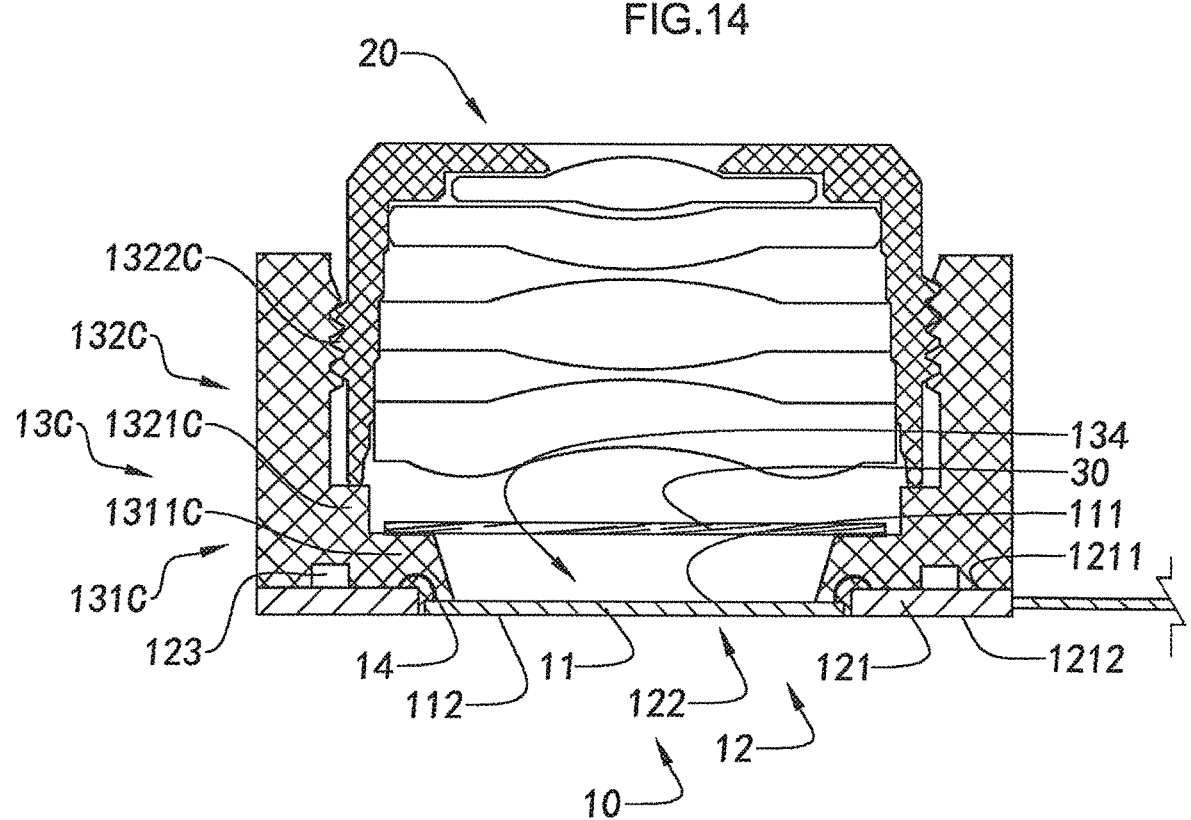
FIG. 15 illustrates an alternative mode of the camera module according to the above fourth preferred embodiment of the present invention.

As shown in FIG. 15, an alternative mode of the camera module according to the fourth preferred embodiment of the present invention is illustrated. The difference between this alternative mode and the fourth embodiment is that the inner wall of the lens portion 132C has a threaded structure 1322C adapted for mounting a threaded lens thereon. Of course, in other embodiments, the interior of the lens portion may also be other different structures to facilitate installation of different types of lens.

Figure 16:
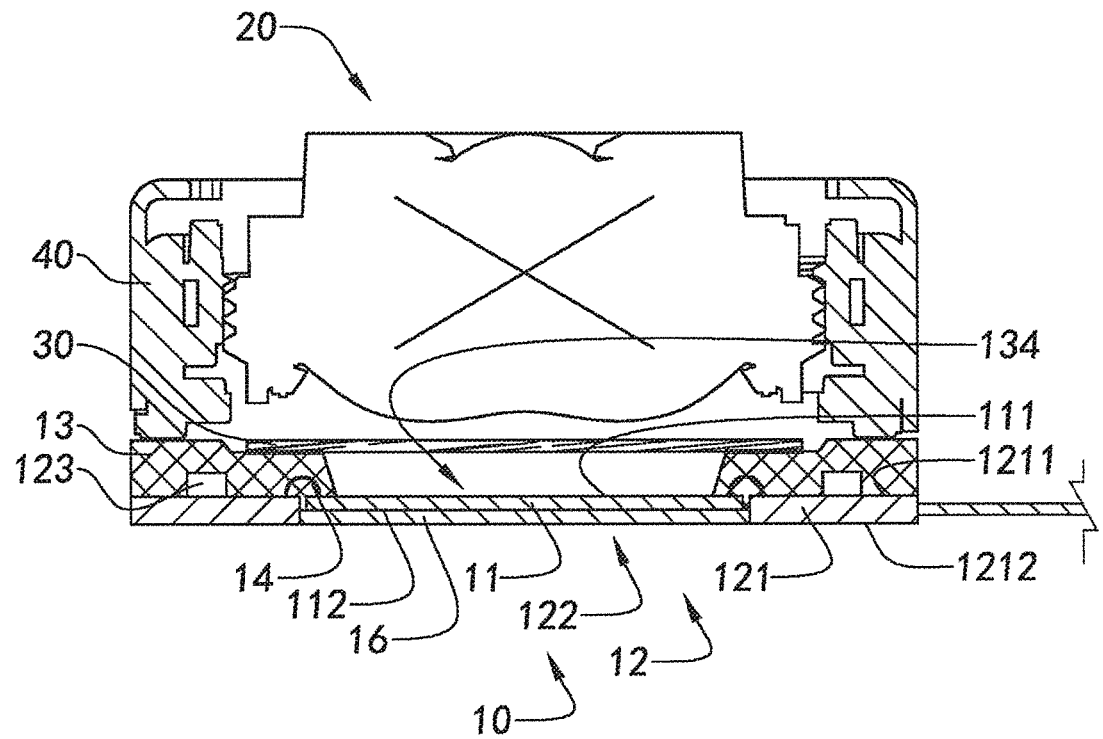
FIG. 16 is a sectional view of a camera module according to a fifth preferred embodiment of the present invention.

FIG. 16 is a sectional view of a camera module according to a fifth preferred embodiment of the present invention. The difference between this fifth embodiment and the above embodiments is that the photosensitive assembly 10 further includes a substrate 16 disposed below the photosensitive element 11.

Furthermore, the bottom of the substrate 16 and the bottom surface 1212 of the board body 121 are substantially aligned on the same level forming a flat bottom surface of the photosensitive assembly 10. In addition, it is preferred that the thickness of the photosensitive element 10 plus the thickness of the substrate 16 is equal to or slightly smaller than the depth of the window 122 of the window circuit board 12. In other words, the substrate 16 fills the remaining space below the photosensitive element 10 installed in the window 122, such that when the thickness of the photosensitive element 11 is smaller than the thickness of the board body 121 and the photosensitive element 11 is arranged to level closely to or at the top surface 1211 of the board body 121, the flatness of the bottom of the photosensitive assembly 10 can be maintained by means of the substrate 16 to avoid any protruding structure at the bottom surface of the photosensitive assembly 10.

The substrate 16 may also enhance the structural strength of the photosensitive assembly 10 as well as the heat dissipation performance. In an embodiment, the substrate 16 can be a metal plate or a plastic plate. In another embodiment, the substrate 16 may be a film layer attached to the bottom surface 112 of the photosensitive element 11 to protect the photosensitive element 11 and enhance the structural strength and heat dissipation performance of the photosensitive element 11. For example, but not limited to, the film layer is a metal coating adapted to be coated on the bottom surface 112 of the photosensitive element 11.

The substrate 16 may be bonded to the circuit board body 121 or bonded to the photosensitive element 11 by adhesive.

Of course, in other embodiments, the substrate 16 may be disposed below the board body 121 that, for example, when the thickness of the photosensitive element 11 is larger than the thickness of the circuit board body 121, the height difference between the photosensitive element 11 and the board body 121 may be made up by the substrate 16 so as to maintain the flatness of the bottom surface of the photosensitive assembly 10.

Figure 17:
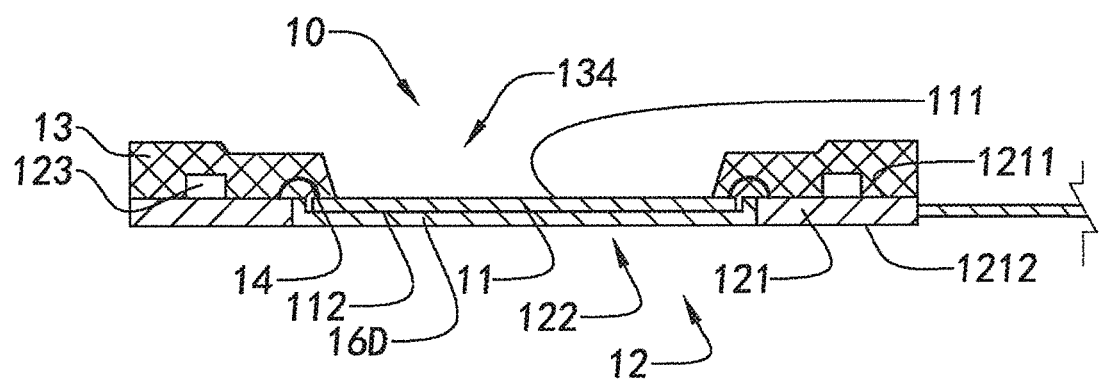
FIG. 17 illustrates an alternative mode of the camera module according to the above fifth preferred embodiment of the present invention.

As shown in FIG. 17, an alternative mode of the photosensitive assembly of the camera module according to the fifth preferred embodiment of the present invention is illustrated. The difference between this alternative mode and the above fifth embodiment is that the window circuit board 12 further includes a substrate 16D, which is received in the window 122 of the window circuit board 12, and that the substrate 16D has a receiving slot indently formed in the top surface thereof to fittingly receive the photosensitive element 11 therein. That is, the substrate 16D provides a mounting site for mounting the photosensitive element 11 in position so that the top surface of the photosensitive element 11 and the board body 121 are aligned with each other at the same level, and that the bottom surface of the substrate 16D is substantially aligned at the same level with the bottom surface of the board body 121 so as to maintain the flatness of bottom surface of the photosensitive assembly 10.

Figure 18:
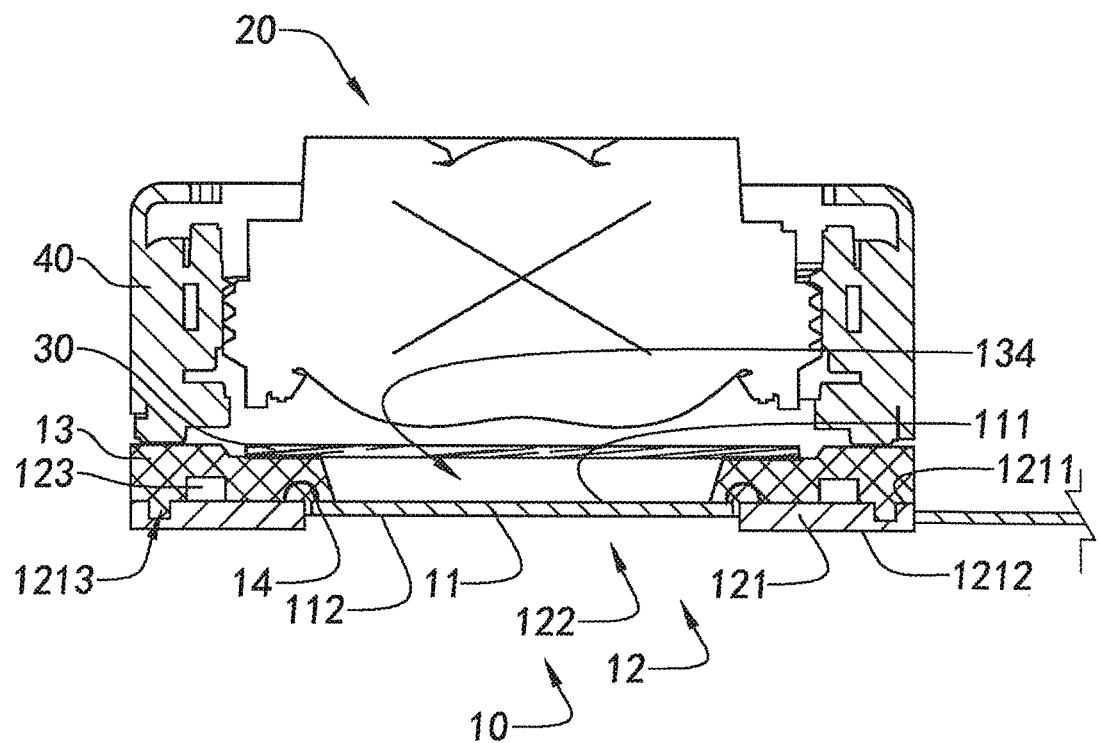
FIG. 18 is a sectional view of a camera module according to a sixth preferred embodiment of the present invention.

As shown in FIG. 18, a camera module according to a sixth preferred embodiment of the present invention is illustrated. The difference between this sixth embodiment and the above embodiments is that, the board body 121 of the window circuit board 12 has at least one reinforcing hole 1213 formed therein, and, correspondingly, the packaging body 13 has at least one inserting portion extended into the reinforcing hole 1213 so as to further engage the packaging body 13 with the window circuit board 12 that can further reinforce the structural strength of the board body 121. The number and the depth of the reinforcing holes 1213 may be arranged as needed and the reinforcing holes 1213 should be provided at positions where the circuit is not provided.

In this sixth embodiment, the reinforcing hole 1213 can be a concave hole, such that both sides of the board body 121 are not communicate with each other through the reinforcing hole 1213.

Figure 19:
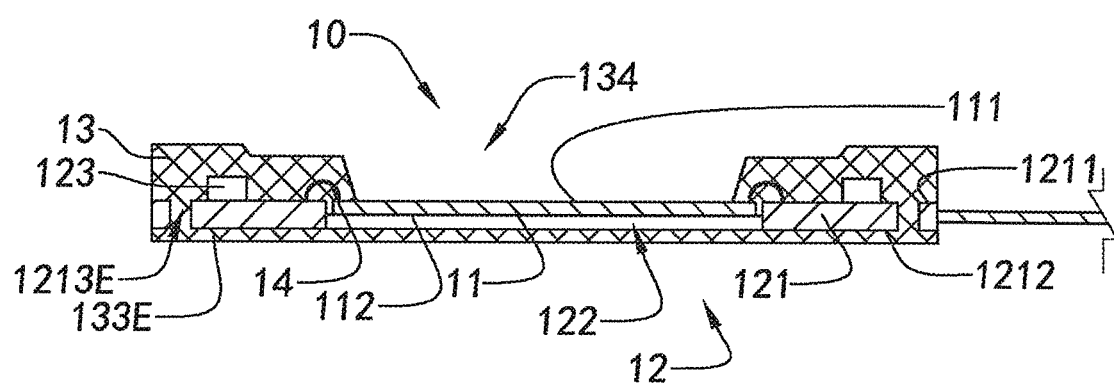
FIG. 19 illustrates an alternative mode of the camera module according to the above sixth preferred embodiment of the present invention.

FIG. 19 illustrates an alternative mode of the photosensitive assembly 10 of the camera module according to the sixth preferred embodiment of the present invention. The difference between this alternative mode and the above sixth embodiment is that the circuit board body 121 of the window circuit board 12 has at least one reinforcing hole 1213E which is a through hole communicating both sides of the board body 121 with each other, wherein the packaging body 13 has an inserting portion extended into the reinforcing hole 1213E so as to further engage the packaging body 13 with the window circuit board 12 that can further reinforce the structural strength of the board body 121.

Furthermore, according to this alternative mode, the packaging body 13 further comprises a packaging layer 133E attached to the bottom of the board body 121 and the photosensitive element 11 while the inserting portion of the packaging body 13 passes through the reinforcing hole 1213E and is extended to the bottom of the board body 121 and the photosensitive element 11 to integrally connect with the packaging layer 133E to form the photosensitive assembly 10 as an integral body, wherein the packaging layer 133E further reinforces the structural strength of the photosensitive assembly 10.

In other words, in this alternative mode, the packaging body 13 is not only formed on top of the board body 121 and an upper portion of the photosensitive element 11, but also integrally formed at the bottom of the board body 121 and the lower portion of the photosensitive element 11. Of course, in other embodiments, the packaging layer 133E may be merely formed below the board body 121, but not covering the photosensitive element 11.

Figure 20:
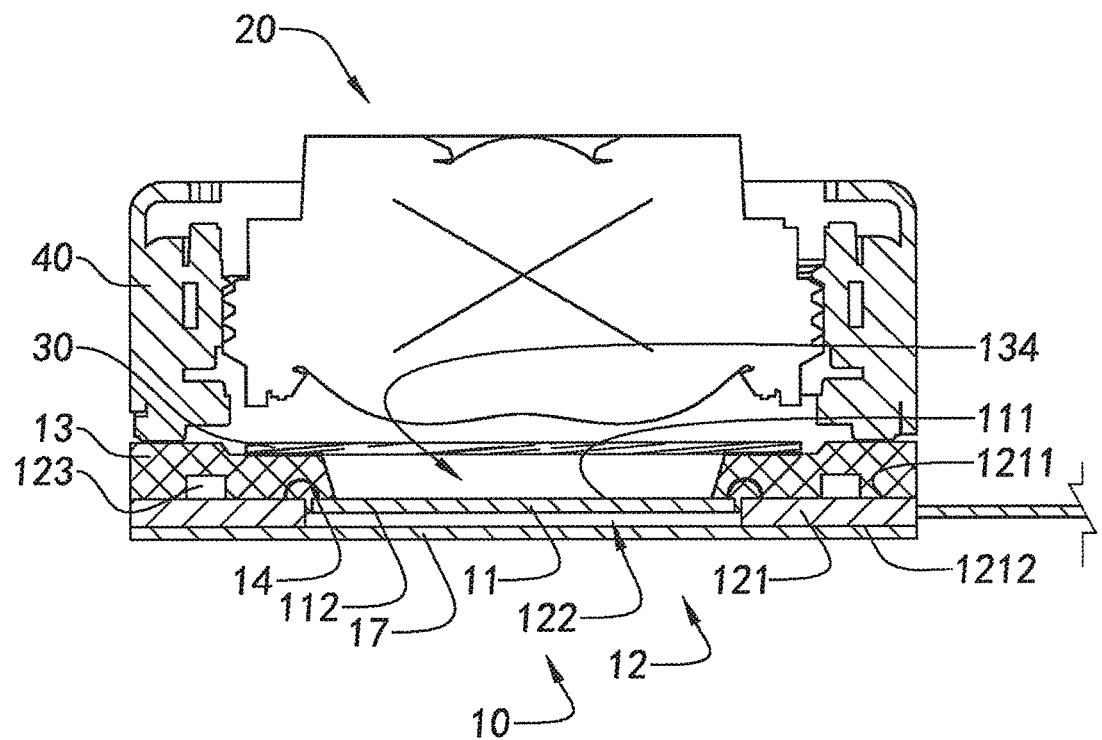
FIG. 20 is a sectional view of a camera module according to a seventh preferred embodiment of the present invention.

As shown in FIG. 20, a camera module according to a seventh preferred embodiment of the present invention is illustrated. The difference between this seventh embodiment and the above embodiments is that, the photosensitive assembly 10 includes a backplane 17, wherein the backplane 17 is attached to the bottom of the board body 121 to reinforce the structural strength of the board body 121, so as to ensure the flatness of the bottom of the photosensitive assembly 10. In one embodiment, the backplane 17 may be a metal plate that not only can enhance the structural strength of the photosensitive assembly 10, but also can increases the heat dissipation performance of the photosensitive assembly 10. In one embodiment, the backplane 17 may be a film layer attached to the bottom surface 112 of the photosensitive element 11 and the bottom surface 1212 of the board body 121, so as to protect the photosensitive element 11 and the board body 121 while enhancing both the heat dissipation performance and the structural strength of the photosensitive element. For example, but not limited to, the film layer is a metal coating coated on the bottom surfaces 112, 1212 of the photosensitive element 11 and the board body 121.

Figure 21:
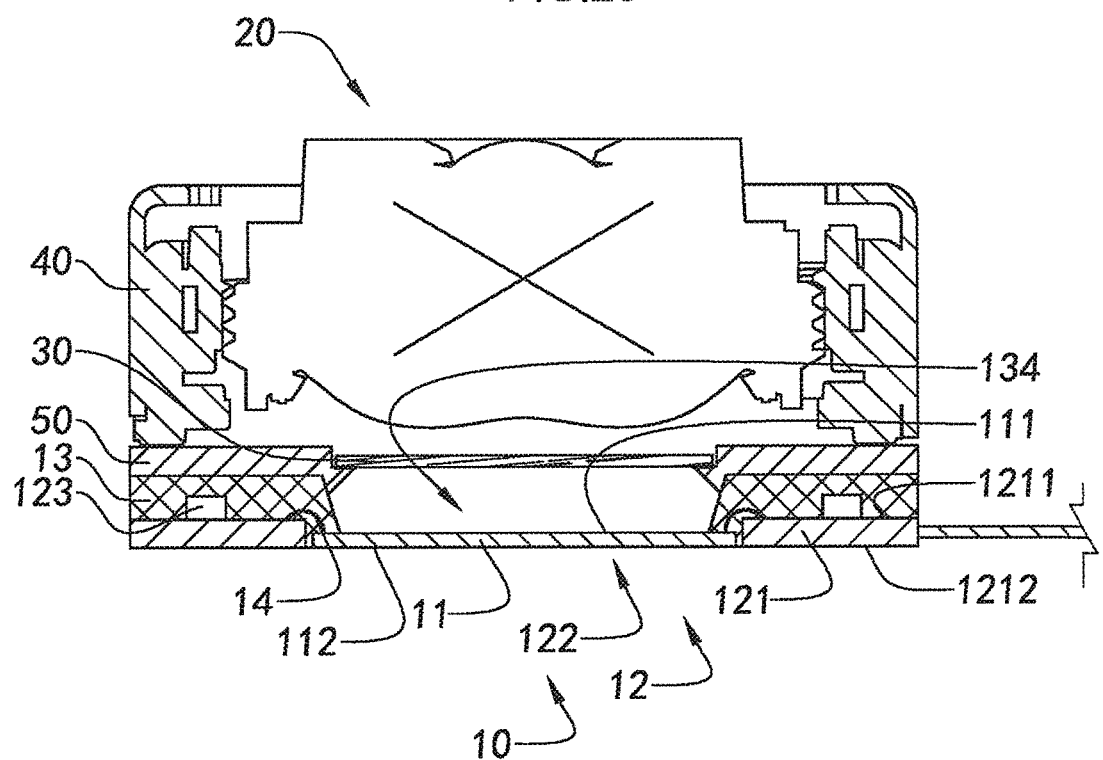
FIG. 21 is a sectional view of a camera module according to an eighth preferred embodiment of the present invention.

Referring to FIG. 21, a camera module according to an eighth preferred embodiment of the present invention is illustrated. The difference between this eighth embodiment and the above embodiments is that the camera module further includes a holder 50 which is mounted on the packaging body 13 and the optical filter 30 is mounted on the holder 50.

Further, the holder 50 may have a bent structure so that one end portion thereof is adapted to be mounted on the packaging body 13 while another end portion is configured to support the optical filter 30 in position.

The holder 50 is preferred to be inwardly and downwardly extended to reduce the distance between the optical filter 30 and the photosensitive element 11 so as to reduce the back focus of the camera module.

In this eighth embodiment, a mounting site is provided for the optical filter 30 by the holder 50 rather than by packaging body 13 directly as shown in the above embodiments. It is worth mentioning that the structure shown in Figures of the present invention is merely as an exemplary but not as a limitation of the present invention. Since the optical filter 30 has a smaller structural strength, the mounting site is required in a larger scale when it is mounted. Accordingly, the width of the mounting portion of the integrated package portion of the packaging body 13 can be reduced by the presence of the holder 50 while providing a larger structural strength thereof.

The holder 50 has a ring shape or a frame structure, viewing from the top, or may be selectively provided on one or more sides of the packaging body 13 or the optical filter 30.

Figure 22:
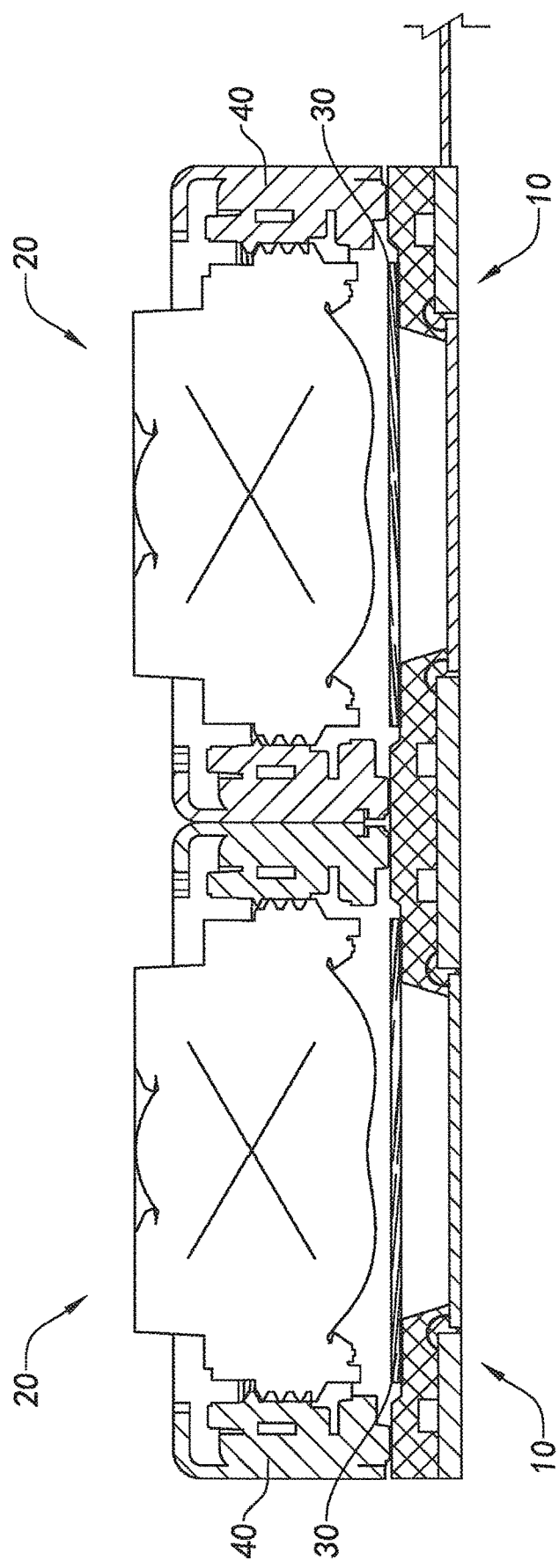
FIG. 22 is a sectional view of a camera module according to a ninth preferred embodiment of the present invention.

Referring to FIG. 22 a camera module according to a ninth preferred embodiment of the present invention is illustrated. The difference between this ninth embodiment and the above embodiments is that, the camera module is embodied as an arrayed camera module which may include two or more photosensitive assemblies 10, two or more lenses 20, two or more drivers 40, and two or more optical filters 30 forming two or more camera module units respectively. According to the ninth embodiment, two camera module units are embodied as an example to illustrate the configuration of the array camera module of the present invention.

It is worth mentioning that, for purpose of illustrating the present invention, a dual camera module is embodied in this ninth embodiment of the present invention, wherein the dual camera module comprises two lenses 20, taken as an example, whereas in other embodiments of the present invention, the number of lenses 20 may be more, such as three or more. It is appreciated that those skilled in the art would understand that the number of lenses 20 and the number of the corresponding components, such as the driver 40, the optical filter 30, the packaging body 13, and/or the holder 50, are not limitation to the scope of the present invention.

More specifically, in this ninth embodiment of the present invention, the photosensitive assembly 10 comprises two window circuit boards 12 integrally connected to form an integral board body so as to form an array structure. The two packaging bodies 13 may be an integrated structure packaged on the two window circuit boards 12 to form two windows corresponding for the two photosensitive elements 11 at one time to provide two light paths for the two lenses 20 respectively. Alternatively, the two packaging bodies can also be two independent bodies, each having a window for the respective photosensitive element 11, respectively packaged on the two window circuit boards 12.

In the present invention, multiple embodiments and different implementation are disclosed. In the description, for purposes of brevity and clarity of description, distinctive features are described in the different embodiments and implements, but in the specific implementation, different features of different embodiments and embodiments may be combined as needed to form different camera modules or photosensitive assemblies 10, and it should also be understood by those skilled in the art that the camera module and the photosensitive assembly 10 are not limited to what is disclosed by the single embodiment or implementation as described in the present invention.

Figure 23:
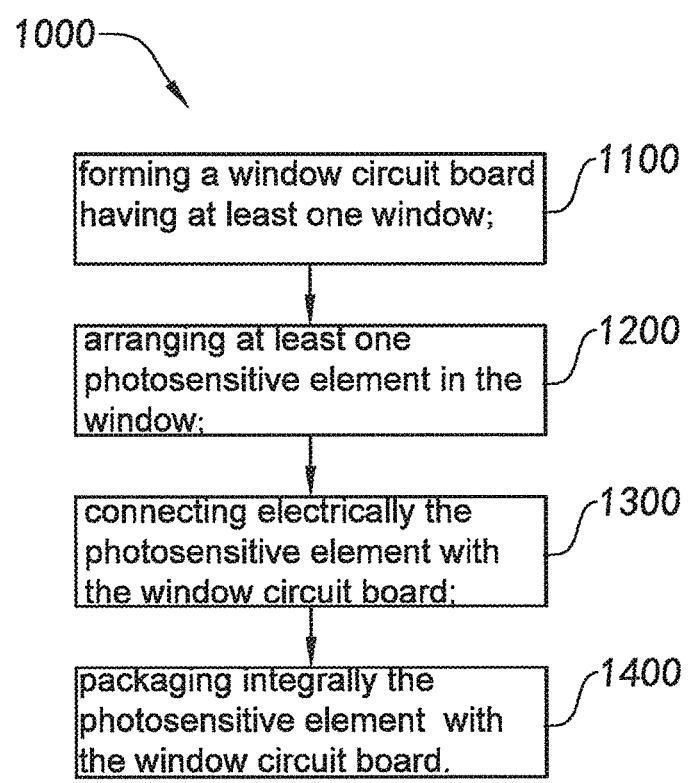
FIG. 23 is a block diagram of a manufacturing method of the photosensitive assembly of the camera module according to the above preferred embodiments of the present invention.

Referring to FIG. 23, according to the above mentioned preferred embodiments of the present invention, the present invention provides a method 1000 of manufacturing a photosensitive assembly 10, which comprises the steps of:

1100: arranging at least one photosensitive element 11 in a window 122 of at least one window circuit board 12;

1200: connecting electrically the photosensitive element 11 with the window circuit board 12; and 1300: integrally forming a packaging body 13 which is integrated with the photosensitive element 11 and the window circuit board 12 and forming a light window 131 in the packaging body 13 aligned along a light path of the photosensitive element 11.

In the step 1100, the window 122 may be an indented recess or a through-hole.

Before the step 1100, the method may further comprise a step of: forming at least one window circuit board 12 having at least one window 122;

In the step 1100, the photosensitive element 11 may be provided on a side near the top surface of the window circuit board 12 so that the top surfaces of the photosensitive element 11 and the window circuit board 12 are aligned with each other. It should be understood that the manner in which the top and bottom surfaces are substantially aligned with each other is merely by way of example only and is not limiting of the present invention.

In the step 1200, the photosensitive element 11 and the window circuit board 12 are electrically connected by one or more electrical connectors 14. In the step 1200, one end of each of the electrical connectors 14 is connected to the photosensitive element 11, and another end of the respective electrical connector 14 is connected to the window circuit board 12.

In the step 1300, the method 1000 further comprises a step of packaging integrally the photosensitive element 11, the electrical connector 14 and the electronic component 123 protruding from the window circuit board 12.

The method 1000 may also include a step 1400 of: attaching, such as bonding, an optical filter 30 to the corresponding photosensitive element 11. The step 1400 may be executed before the step 1300 or after the step 1300.

The method 1000 may further include a step 1500 of: forming at least one reinforcing hole 1213 in the board body 121 of the window circuit board 12 and extending the packaging body 13 into the reinforcing hole.

The method 1000 may also include a step 1600 of: attaching a backplane 17 to the bottom of the window circuit board 12.

In one embodiment, in the step 1300, the photosensitive element 11 and the window circuit board 12 are brought into contact, and the packaging body 13 integrally connects the photosensitive element 11 and the window circuit board. 12 to form the photosensitive assembly 10 as an integral body.

In another embodiment, in the step 1300, the photosensitive element and the window circuit board 12 are spacedly arranged to form a gap between each other, and the packaging body 13 is integrally connected and filled between the photosensitive element 11 and the window circuit board 12 to reinforce the photosensitive element 11 and the window circuit board 12.

In another embodiment, in the step 1300, a medium is filled between the photosensitive element 11 and the window circuit board 12 to connect them with each other, wherein the packaging body 13 integrally connects the photosensitive element 11, the medium, and the window circuit board 12. For example, curing at least portion of the periphery of the non-photosensitive area 1112 of the photosensitive element 11 by adhering glue to connect the photosensitive element 11 and the window circuit board 12 with each other.

The integrated package method can be processed by a molding process, for example, employing an insert molding or a compression molding process by an injection molding machine.

One skilled in the art will understand that the embodiment of the present invention as shown in the drawings and described above is exemplary only and not intended to be limiting.

The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A photosensitive assembly for assembling at least a camera module comprising at least one lens, comprising:
   at least one window circuit board comprising a board body which has at least one window formed therein;
   at least one photosensitive element supported in said at least one window to define a gap between said at least one photosensitive element and said at least one window circuit board, wherein said at least one photosensitive element has a photosensitive area and a non-photosensitive area surrounding said photosensitive area to electrically connect with said at least one window circuit board;
   at least one packaging body provided around said photosensitive area of said at least one photosensitive element above said at least one window circuit board adapted for installing the lens thereon to form the camera module, wherein at least a portion of said non-photosensitive area of said at least one photosensitive element and at least a portion of top side of said at least one window circuit board are integrally packaged by said at least one packaging body to define a light window within said at least one packaging body, wherein said at least one packaging body is not extended into said gap, such that said gap is not filled by said at least one packaging body when at least one packaging body packs on said at least one photosensitive element and said at least one window circuit board; and
   an adhesive filled into said gap that said adhesive not only adheres said at least one photosensitive element with said at least one window circuit board within said at least one window thereof but also prevents said at least one packaging body being filled into said gap.

2. A photosensitive assembly for assembling at least a camera module comprising at least one lens, comprising:
   at least one window circuit board comprising a board body which has at least one window formed therein;
   at least one photosensitive element supported in said at least one window to define a gap between said at least one photosensitive element and said at least one window circuit board, wherein said at least one photosensitive element has a photosensitive area and a non-photosensitive area surrounding said photosensitive area to electrically connect with said at least one window circuit board;
   at least one packaging body provided around said photosensitive area of said at least one photosensitive element above said at least one window circuit board adapted for installing the lens thereon to form the camera module, wherein at least a portion of said non-photosensitive area of said at least one photosensitive element and at least a portion of top side of said at least one window circuit board are integrally packaged by said at least one packaging body to define a light window within said at least one packaging body, wherein said at least one packaging body is not extended into said gap, such that said gap is not filled by said at least one packaging body when at least one packaging body packs on said at least one photosensitive element and said at least one window circuit board; and
   one or more electrical connectors packed in said at least one packaging body, wherein one end of each of said electrical connectors is electrically connected to said non-photosensitive area of said at least one photosensitive element and another end of each of said one or more electrical connectors is extended across said gap to electrically connected to said board body.

3. A photosensitive assembly for assembling at least a camera module comprising at least one lens, comprising:
   at least one window circuit board comprising a board body which has at least one window formed therein;
   at least one photosensitive element supported in said at least one window to define a gap between said at least one photosensitive element and said at least one window circuit board, wherein said at least one photosensitive element has a photosensitive area and a non-photosensitive area surrounding said photosensitive area to electrically connect with said at least one window circuit board;
   at least one packaging body provided around said photosensitive area of said at least one photosensitive element above said at least one window circuit board adapted for installing the lens thereon to form the camera module, wherein at least a portion of said non-photosensitive area of said at least one photosensitive element and at least a portion of top side of said at least one window circuit board are integrally packaged by said at least one packaging body to define a light window within said at least one packaging body, wherein said at least one packaging body is not extended into said gap, such that said gap is not filled by said at least one packaging body when at least one packaging body packs on said at least one photosensitive element and said at least one window circuit board; and
   an optical filter provided on said at least one photosensitive element, wherein said at least one packaging body has a top receiving groove to support said optical filter thereon so as to retain said optical lens above said at least one photosensitive element.

4. A method of manufacturing a photosensitive assembly for assembling at least a camera module, comprising the steps of:
   (a) constructing at least one window circuit board to have a board body and a window formed thereat;
   (b) supporting at least one photosensitive element in said window to define a gap between said at least one photosensitive element and said at least one window circuit board, and electrically connecting said at least one photosensitive element with said at least one window circuit board;
   (c) filling an adhesive into said gap; and
   (d) integrally packaging at least one packaging body on said at least one window circuit board so as to integrate said at least one photosensitive element and said at least one window circuit board with said at least one packaging body to form said photosensitive assembly while defining a light window in said at least one packaging body aligned with said at least one photosensitive element to form a light path, wherein said at least one packaging body is not extended into said gap, such that said gap is not filled by said at least one packaging body when said at least one packaging body packs on said at least one photosensitive element and said at least one window circuit board, such that said adhesive not only adheres said at least one photosensitive element with said at least one window circuit board within said window thereof but also prevents said at least one packaging body being filled into said gap.

5. A method of manufacturing a photosensitive assembly for assembling at least a camera module, comprising the steps of:
- (a) constructing at least one window circuit board to have a board body and a window formed thereat;
- (b) supporting at least one photosensitive element in said window to define a gap between said at least one photosensitive element and said at least one window circuit board, and electrically connecting said at least one photosensitive element with said at least one window circuit board, wherein said at least one photosensitive element is electrically connected with said at least one window circuit board via one or more electrical connectors by the steps of electrically connecting one end of each of said one or more electrical connectors to said non-photosensitive area of said at least one photosensitive element and extending another end of each of said one or more electrical connectors across said gap to electrically connect to said board body; and
- (c) integrally packaging at least one packaging body on said window circuit board so as to integrate said photosensitive element and said window circuit board with said packaging body to form said photosensitive assembly while defining a light window in the packaging body aligned with the photosensitive element to form a light path, wherein said one or more electrical connectors are packed in said at least one packaging body, wherein said at least one packaging body is not extended into said gap, such that said gap is not filled by said packaging body when packaging body packs on said photosensitive element and said window circuit board.

6. A method of manufacturing a photosensitive assembly for assembling at least a camera module, comprising the steps of:
- (a) constructing at least one window circuit board to have a board body and a window formed thereat;
- (b) supporting at least one photosensitive element in said window to define a gap between said at least one photosensitive element and said at least one window circuit board, and electrically connecting said at least one photosensitive element with said at least one window circuit board;
- (c) integrally packaging at least one packaging body on said window circuit board so as to integrate said photosensitive element and said window circuit board with said packaging body to form said photosensitive assembly while defining a light window in the packaging body aligned with the photosensitive element to form a light path, wherein said at least one packaging body is not extended into said gap, such that said gap is not filled by said packaging body when packaging body packs on said photosensitive element and said window circuit board; and
- (d) supporting an optical filter on said at least one photosensitive element, wherein said at least one packaging body has a top receiving groove to support said optical filter thereon so as to retain said optical lens above said at least one photosensitive element.

7. A camera module, comprising:
at least one lens; and
a photosensitive assembly which comprises:
at least one window circuit board;
at least one photosensitive element, having a photosensitive area and a non-photosensitive area, supported in a window of said at least one window circuit board to define a gap between said at least one photosensitive element and said at least one window circuit board;
at least one packaging body provided around said photosensitive area of said at least one photosensitive element above said at least one window circuit board, wherein said at least one lens is installed on said at least one packaging body, wherein at least a portion of said non-photosensitive area of said at least one photosensitive element and at least a portion of a top side of said at least one window circuit board are integrally packaged by said at least one packaging body to define a light window within said at least one packaging body, wherein said at least one packaging body is not extended into said gap, such that said gap is not filled by said packaging body when said at least one packaging body packs on said at least one photosensitive element and said at least one window circuit board; and
an adhesive filled into said gap that said adhesive not only adheres said photosensitive element with said window circuit board within said window thereof but also prevents said packaging body being filled into said gap.

8. A camera module, comprising:
at least one lens; and
a photosensitive assembly which comprises:
at least one window circuit board;
at least one photosensitive element, having a photosensitive area and a non-photosensitive area, supported in a window of said at least one window circuit board to define a gap between said at least one photosensitive element and said at least one window circuit board;
at least one packaging body provided around said photosensitive area of said at least one photosensitive element above said at least one window circuit board, wherein said at least one lens is installed on said at least one packaging body, wherein at least a portion of said non-photosensitive area of said at least one photosensitive element and at least a portion of a top side of said at least one window circuit board are integrally packaged by said at least one packaging body to define a light window within said at least one packaging body, wherein said at least one packaging body is not extended into said gap, such that said gap is not filled by said packaging body when said at least one packaging body packs on said at least one photosensitive element and said at least one window circuit board; and
an optical filter provided on said at least one photosensitive element, wherein said at least one packaging body has a top receiving groove to support said optical filter thereon so as to retain said optical lens above said at least one photosensitive element.

* * * * *